(12) United States Patent
Ganichev et al.

(10) Patent No.: US 11,019,167 B2
(45) Date of Patent: May 25, 2021

(54) MANAGEMENT OF UPDATE QUEUES FOR NETWORK CONTROLLER

(71) Applicant: Nicira, Inc., Palo Alto, CA (US)

(72) Inventors: Igor Ganichev, Mountain View, CA (US); Alexander Yip, Menlo Park, CA (US); Pankaj Thakkar, Cupertino, CA (US); Teemu Koponen, San Francisco, CA (US); Aayush Saxena, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 1155 days.

(21) Appl. No.: 15/143,462

(22) Filed: Apr. 29, 2016

(65) Prior Publication Data

US 2017/0318113 A1   Nov. 2, 2017

(51) Int. Cl.
*H04N 21/431* (2011.01)
*H04L 29/08* (2006.01)
(Continued)

(52) U.S. Cl.
CPC ...... *H04L 67/2828* (2013.01); *H04L 41/0813* (2013.01); *H04L 43/16* (2013.01); *H04L 67/34* (2013.01); *H04L 45/64* (2013.01)

(58) Field of Classification Search
CPC ..................................................... H04L 43/16
(Continued)

(56) References Cited

U.S. PATENT DOCUMENTS 5,426,774 A   6/1995   Banerjee et al.
5,504,921 A   4/1996   Dev et al.
(Continued)

FOREIGN PATENT DOCUMENTS

CN   101136866 A   3/2008
CN   101437326 A   5/2009
(Continued)

OTHER PUBLICATIONS

Kent, William, "A Simple Guide to Five Normal Forms in Relational Database Theory," Communications of the ACM, Feb. 1, 1983, 6 pages, vol. 26, No. 2, Association for Computing Machinery, Inc., USA.
(Continued)

*Primary Examiner* — Sibte H Bukhari
(74) *Attorney, Agent, or Firm* — Adeli LLP

(57) ABSTRACT

Some embodiments provide a method for a network controller that manages multiple managed forwarding elements (MFEs) that implement multiple logical networks. The method stores (i) a first data structure including an entry for each logical entity in a desired state of the multiple logical networks and (ii) a second data structure including an entry for each logical entity referred to by an update for at least one MFE. Upon receiving updates specifying modifications to the logical entities, the method adds separate updates to separate queues for the MFEs that require the update. The separate updates reference the logical entity entries in the second data structure. When the second data structure reaches a threshold size in comparison to the first data structure, the method compacts the updates in at least one of the queues so that each queue has no more than one update referencing a particular logical entity entry.

27 Claims, 11 Drawing Sheets

(51) Int. Cl.
*H04L 12/24* (2006.01)
*H04L 12/26* (2006.01)
*H04L 12/715* (2013.01)

(58) Field of Classification Search
USPC .................................................. 709/223
See application file for complete search history.

(56) References Cited

U.S. PATENT DOCUMENTS

| | | |
|---|---|---|
| 5,550,816 A | 8/1996 | Hardwick et al. |
| 5,729,685 A | 3/1998 | Chatwani et al. |
| 5,751,967 A | 5/1998 | Raab et al. |
| 5,796,936 A | 8/1998 | Watabe et al. |
| 5,805,791 A | 9/1998 | Grossman et al. |
| 6,055,243 A | 4/2000 | Vincent et al. |
| 6,104,699 A | 8/2000 | Holender et al. |
| 6,219,699 B1 | 4/2001 | Mccloghrie et al. |
| 6,366,582 B1 | 4/2002 | Nishikado et al. |
| 6,512,745 B1 | 1/2003 | Abe et al. |
| 6,539,432 B1 | 3/2003 | Taguchi et al. |
| 6,680,934 B1 | 1/2004 | Cain |
| 6,768,740 B1 | 7/2004 | Perlman et al. |
| 6,785,843 B1 | 8/2004 | McRae et al. |
| 6,862,263 B1 | 3/2005 | Simmons |
| 6,941,487 B1 | 9/2005 | Balakrishnan et al. |
| 6,963,585 B1 | 11/2005 | Pennec et al. |
| 6,999,454 B1 | 2/2006 | Crump |
| 7,042,912 B2 | 5/2006 | Smith et al. |
| 7,046,630 B2 | 5/2006 | Abe et al. |
| 7,096,228 B2 | 8/2006 | Theimer et al. |
| 7,120,728 B2 | 10/2006 | Krakirian et al. |
| 7,126,923 B1 | 10/2006 | Yang et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,263,290 B2 | 8/2007 | Fortin et al. |
| 7,283,473 B2 | 10/2007 | Arndt et al. |
| 7,286,490 B2 | 10/2007 | Saleh et al. |
| 7,342,916 B2 | 3/2008 | Das et al. |
| 7,343,410 B2 | 3/2008 | Mercier et al. |
| 7,359,971 B2 | 4/2008 | Jorgensen |
| 7,450,598 B2 | 11/2008 | Chen et al. |
| 7,460,482 B2 | 12/2008 | Pike |
| 7,478,173 B1 | 1/2009 | Delco |
| 7,483,370 B1 | 1/2009 | Dayal et al. |
| 7,512,744 B2 | 3/2009 | Banga et al. |
| 7,555,002 B2 | 6/2009 | Arndt et al. |
| 7,606,260 B2 | 10/2009 | Oguchi et al. |
| 7,627,692 B2 | 12/2009 | Pessi |
| 7,649,851 B2 | 1/2010 | Takashige et al. |
| 7,710,874 B2 | 5/2010 | Balakrishnan et al. |
| 7,730,486 B2 | 6/2010 | Herington |
| 7,764,599 B2 | 7/2010 | Doi et al. |
| 7,792,987 B1 | 9/2010 | Vohra et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,903,666 B1 | 3/2011 | Kumar et al. |
| 7,929,424 B2 | 4/2011 | Kochhar et al. |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,010,696 B2 | 8/2011 | Sankaran et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,779 B2 | 11/2011 | Beardsley et al. |
| 8,060,875 B1 | 11/2011 | Lambeth |
| 8,068,408 B2 | 11/2011 | Ansari et al. |
| 8,089,871 B2 | 1/2012 | Iloglu et al. |
| 8,131,852 B1 | 3/2012 | Miller et al. |
| 8,144,630 B1 | 3/2012 | Orr |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,230,050 B1 | 7/2012 | Brandwine et al. |
| 8,239,572 B1 | 8/2012 | Brandwine et al. |
| 8,265,075 B2 | 9/2012 | Pandey |
| 8,312,129 B1 | 11/2012 | Miller et al. |
| 8,320,388 B2 | 11/2012 | Louati et al. |
| 8,321,561 B2 | 11/2012 | Fujita et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,422,359 B2 | 4/2013 | Nakajima |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,578,003 B2 | 11/2013 | Brandwine et al. |
| 8,605,734 B2 | 12/2013 | Ichino |
| 8,612,627 B1 | 12/2013 | Brandwine |
| 8,621,058 B2 | 12/2013 | Eswaran et al. |
| 8,644,188 B1 | 2/2014 | Brandwine et al. |
| 8,705,513 B2 | 4/2014 | Merwe et al. |
| 8,750,288 B2 | 6/2014 | Nakil et al. |
| 8,762,501 B2 | 6/2014 | Kempf et al. |
| 8,958,298 B2 | 2/2015 | Zhang et al. |
| 8,959,215 B2 | 2/2015 | Koponen et al. |
| 9,007,903 B2 | 4/2015 | Koponen et al. |
| 9,124,538 B2 | 4/2015 | Koponen et al. |
| 9,083,609 B2 | 7/2015 | Casado et al. |
| 9,137,102 B1 | 9/2015 | Miller et al. |
| 9,137,107 B2 | 9/2015 | Koponen et al. |
| 9,154,433 B2 | 10/2015 | Koponen et al. |
| 9,172,603 B2 | 10/2015 | Padmanabhan et al. |
| 9,178,833 B2 | 11/2015 | Koponen et al. |
| 9,203,701 B2 | 12/2015 | Koponen et al. |
| 9,253,109 B2 | 2/2016 | Koponen et al. |
| 9,306,843 B2 | 4/2016 | Koponen et al. |
| 9,319,337 B2 | 4/2016 | Koponen et al. |
| 9,319,338 B2 | 4/2016 | Padmanabhan et al. |
| 9,331,937 B2 | 5/2016 | Koponen et al. |
| 9,354,989 B1 | 5/2016 | Sehgal et al. |
| 9,391,880 B2 | 7/2016 | Koide |
| 9,602,421 B2 | 3/2017 | Koponen et al. |
| 9,722,871 B2 | 8/2017 | Miller et al. |
| 9,838,336 B2 | 12/2017 | Koide |
| 9,843,476 B2 | 12/2017 | Koponen et al. |
| 9,887,960 B2 * | 2/2018 | Chanda ............... H04L 61/2015 |
| 9,923,760 B2 | 3/2018 | Shakimov et al. |
| 9,967,134 B2 | 5/2018 | Shakimov et al. |
| 10,033,579 B2 | 7/2018 | Koponen et al. |
| 10,135,676 B2 | 11/2018 | Koponen et al. |
| 10,204,122 B2 | 2/2019 | Shakimov et al. |
| 10,313,255 B1 * | 6/2019 | Matthews ........... H04L 43/0829 |
| 2001/0043614 A1 | 11/2001 | Viswanadham et al. |
| 2001/0044825 A1 | 11/2001 | Barritz |
| 2002/0034189 A1 | 3/2002 | Haddock et al. |
| 2002/0093952 A1 | 7/2002 | Gonda |
| 2002/0161867 A1 | 10/2002 | Cochran et al. |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0093481 A1 | 5/2003 | Mitchell et al. |
| 2003/0204768 A1 | 10/2003 | Fee |
| 2003/0233385 A1 | 12/2003 | Srinivasa et al. |
| 2004/0044773 A1 | 3/2004 | Bayus et al. |
| 2004/0047286 A1 | 3/2004 | Larsen et al. |
| 2004/0054680 A1 | 3/2004 | Kelley et al. |
| 2004/0073659 A1 | 4/2004 | Rajsic et al. |
| 2004/0098505 A1 | 5/2004 | Clemmensen |
| 2004/0101274 A1 | 5/2004 | Foisy et al. |
| 2004/0267866 A1 | 12/2004 | Carollo et al. |

(56) References Cited

U.S. PATENT DOCUMENTS

| | | |
|---|---|---|
| 2004/0267897 A1 | 12/2004 | Hill et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0038834 A1 | 2/2005 | Souder et al. |
| 2005/0083953 A1 | 4/2005 | May |
| 2005/0120160 A1 | 6/2005 | Plouffe et al. |
| 2005/0132044 A1 | 6/2005 | Guingo et al. |
| 2005/0147095 A1 | 7/2005 | Guerrero et al. |
| 2005/0220096 A1 | 10/2005 | Friskney et al. |
| 2005/0228952 A1 | 10/2005 | Mayhew et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0028999 A1 | 2/2006 | Iakobashvili et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0182033 A1 | 8/2006 | Chen et al. |
| 2006/0182037 A1 | 8/2006 | Chen et al. |
| 2006/0184937 A1 | 8/2006 | Abels et al. |
| 2006/0193266 A1 | 8/2006 | Siddha et al. |
| 2006/0221961 A1 | 10/2006 | Basso et al. |
| 2007/0005627 A1 | 1/2007 | Dodge |
| 2007/0043860 A1 | 2/2007 | Pabari |
| 2007/0156919 A1 | 7/2007 | Potti et al. |
| 2007/0220358 A1 | 9/2007 | Goodill et al. |
| 2007/0239944 A1 | 10/2007 | Rupanagunta et al. |
| 2007/0239987 A1 | 10/2007 | Hoole et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0034249 A1 | 2/2008 | Husain et al. |
| 2008/0040467 A1 | 2/2008 | Mendiratta et al. |
| 2008/0049614 A1 | 2/2008 | Briscoe et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0133687 A1 | 6/2008 | Fok et al. |
| 2008/0159301 A1 | 7/2008 | Heer |
| 2008/0163207 A1 | 7/2008 | Reumann et al. |
| 2008/0165704 A1 | 7/2008 | Marchetti et al. |
| 2008/0189769 A1 | 8/2008 | Casado et al. |
| 2008/0212963 A1 | 9/2008 | Fortin et al. |
| 2008/0225853 A1 | 9/2008 | Melman et al. |
| 2008/0240122 A1 | 10/2008 | Richardson et al. |
| 2008/0291910 A1 | 11/2008 | Tadimeti et al. |
| 2008/0301303 A1 | 12/2008 | Matsuoka |
| 2009/0001845 A1 | 1/2009 | Ikehashi |
| 2009/0031041 A1 | 1/2009 | Clemmensen |
| 2009/0043823 A1 | 2/2009 | Iftode et al. |
| 2009/0070501 A1 | 3/2009 | Kobayashi et al. |
| 2009/0083445 A1 | 3/2009 | Ganga |
| 2009/0113031 A1 | 4/2009 | Ruan et al. |
| 2009/0122710 A1 | 5/2009 | Bar-Tor et al. |
| 2009/0132691 A1 | 5/2009 | Daurensan et al. |
| 2009/0150521 A1 | 6/2009 | Tripathi |
| 2009/0150527 A1 | 6/2009 | Tripathi et al. |
| 2009/0161547 A1 | 6/2009 | Riddle et al. |
| 2009/0245793 A1 | 10/2009 | Chiang |
| 2009/0249470 A1 | 10/2009 | Litvin et al. |
| 2009/0249473 A1 | 10/2009 | Cohn |
| 2009/0276661 A1 | 11/2009 | Deguchi et al. |
| 2009/0279536 A1 | 11/2009 | Unbehagen et al. |
| 2009/0279549 A1 | 11/2009 | Ramanathan et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046530 A1 | 2/2010 | Hautakorpi et al. |
| 2010/0046531 A1 | 2/2010 | Louati et al. |
| 2010/0058106 A1 | 3/2010 | Srinivasan et al. |
| 2010/0061231 A1 | 3/2010 | Harmatos et al. |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0153554 A1 | 6/2010 | Anschutz et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0191848 A1 | 7/2010 | Fujita et al. |
| 2010/0205479 A1 | 8/2010 | Akutsu et al. |
| 2010/0214949 A1 | 8/2010 | Smith et al. |
| 2010/0257263 A1 | 10/2010 | Casado et al. |
| 2010/0275199 A1 | 10/2010 | Smith et al. |
| 2010/0290485 A1 | 11/2010 | Martini et al. |
| 2010/0322255 A1 | 12/2010 | Hao et al. |
| 2011/0016215 A1 | 1/2011 | Wang |
| 2011/0026521 A1 | 2/2011 | Gamage et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0080870 A1 | 4/2011 | Bhalla et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0173490 A1 | 7/2011 | Narayanaswamy et al. |
| 2011/0261825 A1 | 10/2011 | Ichino |
| 2011/0273988 A1 | 11/2011 | Tourrilhes et al. |
| 2011/0296052 A1 | 12/2011 | Guo et al. |
| 2011/0299534 A1 | 12/2011 | Koganti et al. |
| 2011/0299537 A1 | 12/2011 | Saraiya et al. |
| 2011/0305167 A1 | 12/2011 | Koide et al. |
| 2011/0310899 A1 | 12/2011 | Alkhatib et al. |
| 2011/0317559 A1 | 12/2011 | Kern et al. |
| 2011/0317701 A1 | 12/2011 | Yamato et al. |
| 2012/0014386 A1 | 1/2012 | Xiong et al. |
| 2012/0147894 A1 | 6/2012 | Mulligan et al. |
| 2012/0151550 A1 | 6/2012 | Zhang |
| 2012/0158942 A1 | 6/2012 | Kalusivalingam et al. |
| 2012/0185553 A1 | 7/2012 | Nelson |
| 2012/0195187 A1 | 8/2012 | Ashihara et al. |
| 2012/0236734 A1 | 9/2012 | Sampath et al. |
| 2012/0239790 A1 | 9/2012 | Doane et al. |
| 2013/0024579 A1 | 1/2013 | Zhang et al. |
| 2013/0044636 A1 | 2/2013 | Koponen et al. |
| 2013/0044752 A1 | 2/2013 | Koponen et al. |
| 2013/0054761 A1 | 2/2013 | Kempf et al. |
| 2013/0058339 A1 | 3/2013 | Casado et al. |
| 2013/0058346 A1 | 3/2013 | Sridharan et al. |
| 2013/0060940 A1 | 3/2013 | Koponen et al. |
| 2013/0103817 A1 | 4/2013 | Koponen et al. |
| 2013/0103818 A1 | 4/2013 | Koponen et al. |
| 2013/0114466 A1 | 5/2013 | Koponen et al. |
| 2013/0117428 A1 | 5/2013 | Koponen et al. |
| 2013/0117429 A1 | 5/2013 | Koponen et al. |
| 2013/0125230 A1 | 5/2013 | Koponen et al. |
| 2013/0163427 A1 | 6/2013 | Beliveau et al. |
| 2013/0163475 A1 | 6/2013 | Beliveau et al. |
| 2013/0208623 A1 | 8/2013 | Koponen et al. |
| 2013/0211549 A1 | 8/2013 | Thakkar et al. |
| 2013/0212148 A1 | 8/2013 | Koponen et al. |
| 2013/0212235 A1 | 8/2013 | Fulton et al. |
| 2013/0212243 A1 | 8/2013 | Thakkar et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0219037 A1 | 8/2013 | Thakkar et al. |
| 2013/0219078 A1 | 8/2013 | Padmanabhan et al. |
| 2013/0227097 A1 | 8/2013 | Yasuda et al. |
| 2013/0332602 A1 | 12/2013 | Nakil et al. |
| 2013/0332619 A1 | 12/2013 | Xie et al. |
| 2014/0016501 A1 | 1/2014 | Kamath et al. |
| 2014/0019639 A1 | 1/2014 | Ueno |
| 2014/0040466 A1 | 2/2014 | Yang |
| 2014/0109037 A1 | 4/2014 | Ouali |
| 2014/0115406 A1 | 4/2014 | Agrawal et al. |

(56) References Cited

U.S. PATENT DOCUMENTS

| | | | |
|---|---|---|---|
| 2014/0115578 A1* | 4/2014 | Cooper | H04L 63/1416 718/1 |
| 2014/0189212 A1 | 7/2014 | Slaight et al. | |
| 2014/0247753 A1 | 9/2014 | Koponen et al. | |
| 2014/0348161 A1 | 11/2014 | Koponen et al. | |
| 2014/0351432 A1 | 11/2014 | Koponen et al. | |
| 2015/0009804 A1 | 1/2015 | Koponen et al. | |
| 2015/0052262 A1* | 2/2015 | Chanda | H04L 61/2015 709/245 |
| 2015/0089032 A1 | 3/2015 | Agarwal et al. | |
| 2015/0263946 A1 | 9/2015 | Tubaltsev et al. | |
| 2015/0263952 A1 | 9/2015 | Ganichev et al. | |
| 2015/0304213 A1 | 10/2015 | Ashihara et al. | |
| 2015/0341205 A1 | 11/2015 | Invernizzi et al. | |
| 2016/0021028 A1 | 1/2016 | Koide | |
| 2016/0050117 A1 | 2/2016 | Voellmy et al. | |
| 2016/0092259 A1* | 3/2016 | Mehta | G06F 9/45558 718/1 |
| 2016/0119224 A1 | 4/2016 | Ramachandran et al. | |
| 2016/0197774 A1 | 7/2016 | Koponen et al. | |
| 2016/0218973 A1 | 7/2016 | Anand | |
| 2016/0294604 A1 | 10/2016 | Shakimov et al. | |
| 2016/0294680 A1 | 10/2016 | Shakimov et al. | |
| 2017/0091004 A1 | 3/2017 | Shakimov et al. | |
| 2018/0083829 A1 | 3/2018 | Koponen et al. | |
| 2019/0188193 A1 | 6/2019 | Shakimov et al. | |

FOREIGN PATENT DOCUMENTS

| | | |
|---|---|---|
| EP | 0737921 A2 | 10/1996 |
| EP | 1443423 A1 | 8/2004 |
| EP | 1653688 A1 | 5/2006 |
| EP | 2838244 A2 | 2/2015 |
| GB | 2485866 A | 5/2012 |
| JP | H107327050 A | 12/1995 |
| JP | H109266493 A | 10/1997 |
| JP | 2003069609 A | 3/2003 |
| JP | 2003124976 A | 4/2003 |
| JP | 2003318949 A | 11/2003 |
| JP | 2006229967 A | 8/2006 |
| JP | 2009159636 A | 7/2009 |
| JP | 2011081588 A | 4/2011 |
| JP | 2011166384 A | 8/2011 |
| JP | 2011166700 A | 8/2011 |
| WO | 2005112390 A1 | 11/2005 |
| WO | 2008095010 A1 | 8/2008 |
| WO | 2009001845 A1 | 12/2008 |
| WO | 2009042919 A2 | 4/2009 |
| WO | 2010103909 A1 | 9/2010 |
| WO | 2011083780 A1 | 7/2011 |
| WO | WO 2011/080870 | 7/2011 |
| WO | 2012093429 A1 | 7/2012 |
| WO | 2013158917 A3 | 10/2013 |
| WO | 2013158918 A1 | 10/2013 |
| WO | 2013184846 A1 | 12/2013 |
| WO | PCT/US2017/013820 | 1/2017 |
| WO | 2017189061 A1 | 11/2017 |

OTHER PUBLICATIONS

Ciavaglia, Laurent, et al., "An Architectural Reference Model for Autonomic Networking, Cognitive Networking and Self-Management," Mar. 2012, 179 pages, Draft ETSI GS AFI 002 V0.0.17, European Telecommunications Standards Institute (ETSI).

Reitblatt, Mark, et al., "Consistent Updates for Software-Defined Networks: Change You Can Believe In!" Proceedings of the 10th ACM Workshop on Hot Topics in Networks, Nov. 14-15, 2011, 6 pages, ACM, Cambridge, MA.

Wang, Wei-Ming, et al., "Analysis and Implementation of an Open Programmable Router Based on Forwarding and Control Element Separation," Journal of Computer Science and Technology, Sep. 2008, 11 pages, vol. 23 Issue 5, Springer International Publishing AG.

PCT International Search Report and Written Opinion dated May 4, 2017 for commonly owned International Patent Application PCT/US17/013820, 15 pages, Nicira, Inc.

Berde, Pankaj, et al., "ONOS Open Network Operating System an Open-Source Distributed SDN OS," Dec. 19, 2013, 34 pages.

Casado, Martin, et al. "Ethane: Taking Control of the Enterprise," SIGCOMM'07, Aug. 27-31, 2007, 12 pages, ACM, Kyoto, Japan.

Enns, R., "NETCONF Configuration Protocol," Dec. 2006, 96 pages, RFC 4741, IETF Trust.

Greenberg, Albert, et al., "A Clean Slate 4D Approach to Network Control and Management," ACM SIGCOMM Computer Communication Review, Oct. 2005, 12 pages, vol. 35, No. 5, ACM, New York, USA.

Greenberg, Albert, et al., "VL2: A Scalable and Flexible Data Center Network," SIGCOMM '09, Aug. 17-21, 2009, 12 pages, ACM, Barcelona, Spain.

Gude, Natasha, et al., "NOX: Towards an Operating System for Networks," ACM SIGCOMM Computer Communication Review, Jul. 2008, 6 pages, vol. 38, No. 3, ACM.

Koponen, Teemu, et al., "Onix: A Distributed Control Platform for Large-scale Production Networks," In Proc. OSDI, Oct. 2010, 14 pages.

Krisfinaswamy, Umesh, et al., "ONOS Open Network Operating System—An Experimental Open-Source Distributed SDN OS," Apr. 16, 2013, 24 pages.

Schneider, Fred B., "Implementing Fault-Tolerant Services Using the State Machine Approach: A Tutorial," ACM Computing Surveys, Dec. 1990, 21 pages, vol. 22, No. 4, ACM.

Terry, Douglas B., "Managing Update Conflicts in Bayou, a Weakly Connected Replicated Storage System," SIGOPS '95, Dec. 1995, 12 pages, ACM, Colorado, USA.

\* cited by examiner

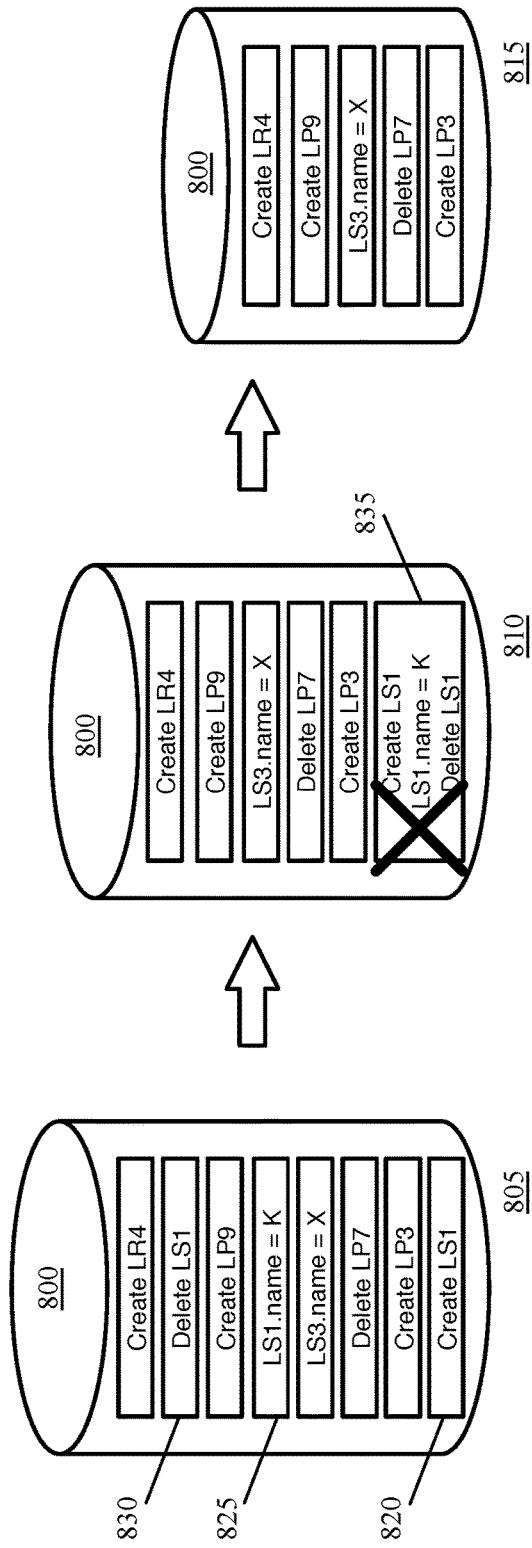
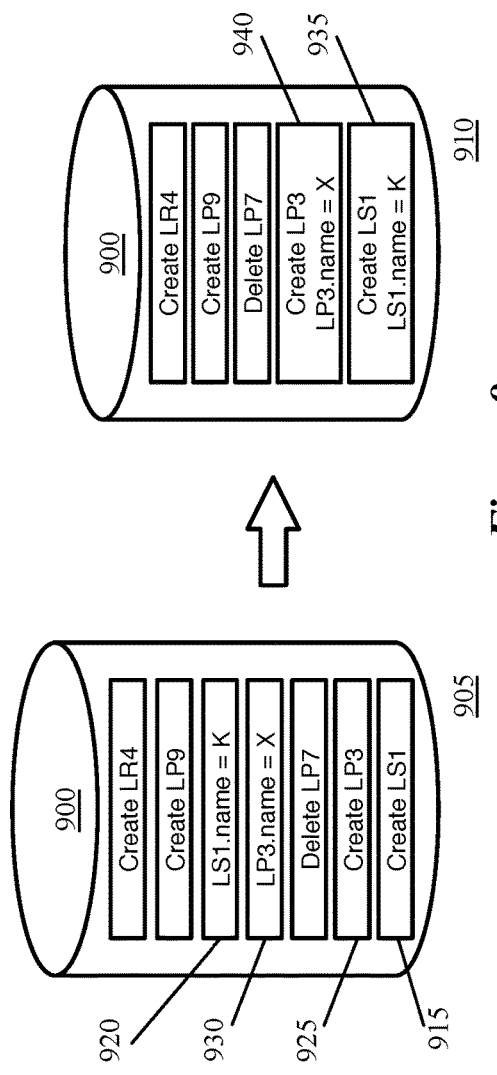
Figure 8
Figure 9

MANAGEMENT OF UPDATE QUEUES FOR NETWORK CONTROLLER

BACKGROUND

Software-defined networking (SDN) often uses network controllers to configure virtual (logical) networks throughout a datacenter. As SDN becomes more prevalent and datacenters cater to more and more tenants, controllers are expected to perform more operations. Key to this architecture is that the controllers do not become bottlenecks in the configuration process, and that these controllers be able to handle when other elements downstream in the configuration process are bottlenecked (i.e., making sure that if one switch is a bottleneck this does not slow the configuration of other switches). As such, techniques to improve the use of processing resources by network controllers are needed.

BRIEF SUMMARY

Some embodiments provide a method for managing update queues at a network controller, that maintains update queues for each managed forwarding element (MFE) of a set of MFEs that the network controller manages. The network controller of some embodiments receives updates to distribute to one or more MFEs, identifies which of the MFEs that it manages require the update, and adds updates to separate queues for each identified MFE. These updates are distributed from the queues to the MFEs (or to local controllers operating alongside the MFEs to manage the MFEs directly). In order to reduce the load on the network controller, in some embodiments the separate updates added to multiple queues for the same received update all refer to a shared entry or entries (e.g., shared objects) stored by the network controller to represent a network entity created, modified, or removed by the update. In addition, some embodiments compact the updates within the separate queues at various times in order to reduce (i) the number of updates in at least some of the queues and (ii) the number of entries stored by the network controller.

The network controller of some embodiments receives updates as changes to the desired state of one or more entities of a logical network implemented by at least a subset of the MFEs managed by the controller. The physical network (e.g., a datacenter, combination of multiple datacenters, etc.) that contains the MFEs may implement multiple logical networks, each of which includes multiple logical entities. These logical entities include, in some embodiments, logical forwarding elements (e.g., logical routers, logical switches) and logical ports of such logical forwarding elements. The updates are received from a management plane application (e.g., running on a separate controller computer) based on, e.g., user input to change the configuration of a logical network. The network controller of some embodiments is responsible for distributing these updates to its set of MFEs (the network controller may be part of a cluster of network controller that each manage different sets of MFEs). The network controller receives the update to the desired state and, based at least in part on the receipt of information received from the MFEs (referred to as runtime state), generates translated state updates for the MFEs. These translated state updates are placed in the distribution (or publication) queues for the MFEs. As noted above, in some embodiments, rather than directly communicating with the MFEs, the network controller publishes the translated state updates to the local controllers that operate alongside the MFEs (e.g., in the same host machines as the MFEs).

As mentioned, the network controller of some embodiments uses shared entries representing the logical entities to which corresponding updates in multiple queues reference. In some embodiments, the controller stores two data structures with entries (e.g., objects) for logical entities. The controller stores (i) a first data structure with an entry for each logical entity in the desired state of the logical networks and (ii) a second data structure with an entry for each logical entity referenced by an update for at least one MFE (possibly including both updates currently in the queues and updates that have been distributed from the queues to the MFEs).

The first data structure represents the current desired state of all of the logical networks, and thus has an entry for each logical switch, logical router, logical switch port, logical router port, etc. of each logical network. In addition, some embodiments create entries (e.g., additional objects) for each property of such a logical entity. Thus, a logical switch port might have a primary object as well as related objects for some or all of its properties that can be modified.

The second data structure, in some embodiments, includes a corresponding entry for each entry in the first data structure (and thus includes entries for all logical entities part of the current desired state of the logical networks) as well as entries for other logical entities that may be referenced by the updates in the queues. When a first update specifies the creation of a logical entity and a later update specifies the deletion of that logical entity, the corresponding entry or entries will be removed from the first data structure. However, because the updates in the queues refer to shared entries, the entry or entries for the logical entity are not removed from the second data structure, to which the updates in the queues refer.

These updates, in some embodiments, are structured as references (e.g., pointers) along with metadata specifying the modification(s) to be made to the logical entity corresponding to the referenced entry. For instance, an update to remove a logical switch would have a reference to the entry for the logical switch along with metadata specifying to delete the object. An update to change the name of the logical switch would have a reference to the same entry (or a related entry for the logical switch name) with metadata specifying the new value for the name property. Having numerous updates in separate queues reference the same entry reduces the memory used by the network controller, as the entries (objects) typically occupy much more memory than the references (pointers) to the objects. This memory load may be a problem if one or more of the queues backs up significantly. Furthermore, multiple separate updates in a queue that modify the same logical entity will also refer to the same shared entry, thereby further saving space.

The updates may be distributed from different queues at different speeds. This may occur due to a MFE (or the local controller for a MFE) operating slowly, connectivity between the network controller and a MFE being cut off for a period of time, different numbers of updates being distributed to different MFEs, etc. Thus, while an update to delete a particular logical port may have been distributed to twenty MFEs, the update could still remain in the queue of a twenty-first MFE, and thus the entry referenced by these twenty-one updates needs to remain in the second data structure.

While using shared objects in the second data structure does reduce the overall memory load on the network controller, both the second data structure and any very slow update queues could grow unendingly large without a procedure in place to limit these structures. Thus, some embodiments use a queue compaction procedure that guarantees an upper bound on the overall memory occupied by the combination of the first data structure, the second data structure, and all of the individual update queues (for a bounded number of desired state logical entities). That is, the overall memory load is guaranteed to be a bounded function of the memory load of the first data structure (which is bounded according to the number of logical entities in the desired state at any given time).

The queue compaction procedure of some embodiments both compacts updates within the queues and removes unnecessary entries from the second data structure. While the compaction procedure is performed continuously in some embodiments, in order to save processing resources other embodiments perform the compaction process whenever the second data structure reaches a specified size. For example, some embodiments perform the compaction process whenever the second data structure reaches a threshold size relative to the first data structure, such as whenever the second data structure has twice as many entries as the first data structure.

To compact updates within the queues, the compaction procedure identifies sets of updates within a queue that reference the same entry and combines these into a single update. That is, rather than two (or more) pointers with separate sets of metadata specifying different modifications to the referenced object, the updates are combined into a single pointer with the metadata combined into a larger set of metadata. In certain cases, the update can be removed from the queue altogether. Specifically, when a first update referencing an entry specifies to create the corresponding logical entity and a last update referencing the same entry specifies to delete the corresponding logical entity, these (and any intervening updates referencing the same entry) updates can be removed from the queue. Similarly, any other pair of updates that specifically negate each other (e.g., a first update adding X to a value of a property and a second update subtracting X from the value of the same property) are removed in some embodiments. On the other hand, a first update adding X to a value of a property and a second update adding Y to the value of the property would be combined into a single update specifying to add X and then add Y to the value of the property.

The compaction process additionally, as noted, removes unnecessary entries from the second data structure, thereby limiting the amount of memory occupied by the second data structure. A particular entry may be removed from the second data structure so long as (i) the particular entry does not have a corresponding entry in the first data structure (i.e., the corresponding logical entity is not part of the current desired network state) and (ii) no updates remain in any of the queues that reference the particular entry. In some embodiments, the network controller removes entries from the second data structure whenever these conditions are met, not only as part of the compaction process. However, the compaction process may result in the removal of updates such that the second condition is met for additional entries.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIGS. 8-10 provide examples of queue compaction, some of which result in the removal of updates.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for managing update queues at a network controller, that maintains update queues for each managed forwarding element (MFE) of a set of MFEs that the network controller manages. The network controller of some embodiments receives updates to distribute to one or more MFEs, identifies which of the MFEs that it manages require the update, and adds updates to separate queues for each identified MFE. These updates are distributed from the queues to the MFEs (or to local controllers operating alongside the MFEs to manage the MFEs directly). In order to reduce the load on the network controller, in some embodiments the separate updates added to multiple queues for the same received update all refer to a shared entry or entries (e.g., shared objects) stored by the network controller to represent a network entity created, modified, or removed by the update. In addition, some embodiments compact the updates within the separate queues at various times in order to reduce (i) the number of updates in at least some of the queues and (ii) the number of entries stored by the network controller.

The network controller of some embodiments receives updates as changes to the desired state of one or more entities of a logical network implemented by at least a subset of the MFEs managed by the controller. The physical network (e.g., a datacenter, combination of multiple datacenters, etc.) that contains the MFEs may implement multiple logical networks, each of which includes multiple logical entities. These logical entities include, in some embodiments, logical forwarding elements (e.g., logical routers, logical switches) and logical ports of such logical forwarding elements.

Figure 1:
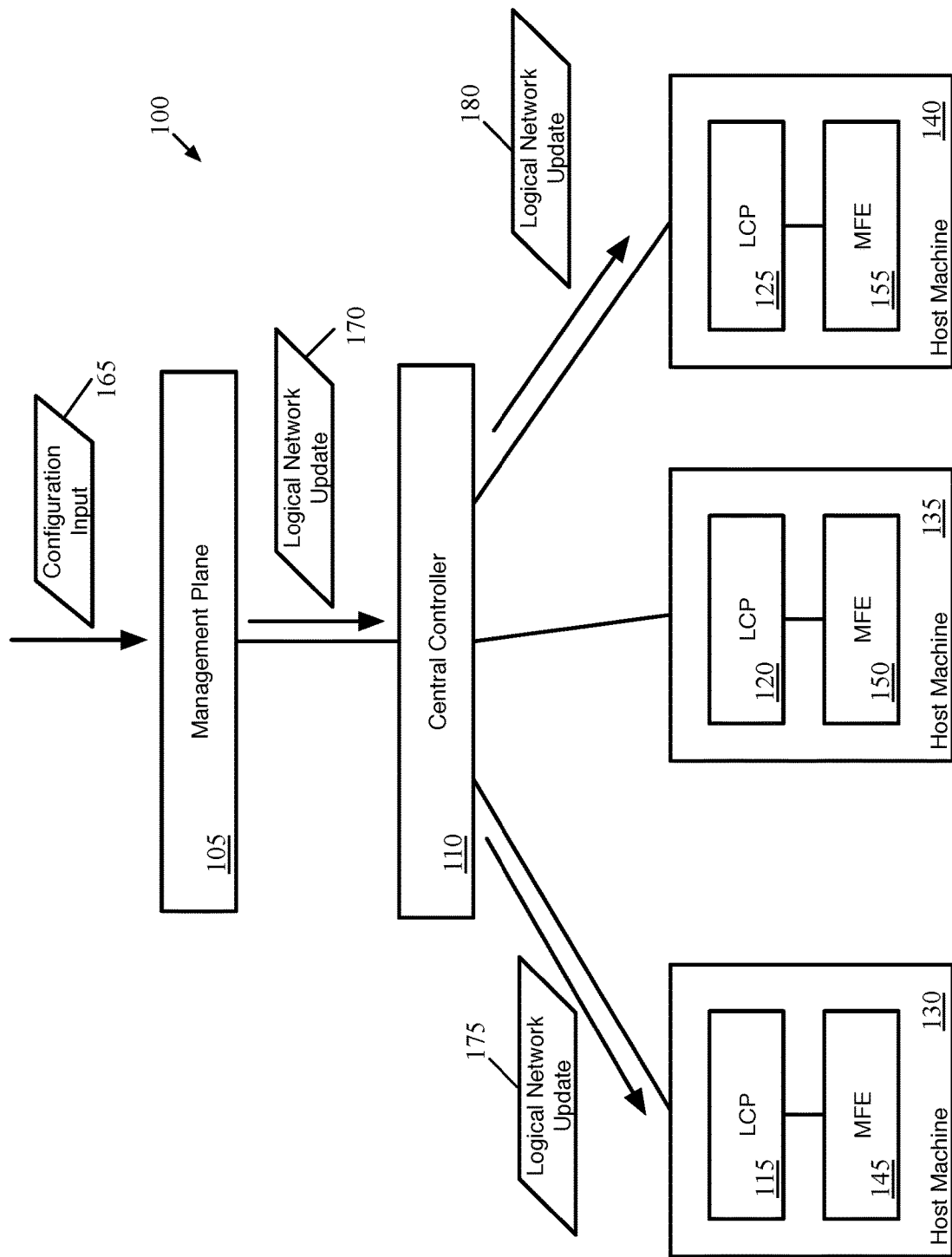
FIG. 1 conceptually illustrates a network control system including a management plane, a central controller, and multiple local controllers.

FIG. 1 conceptually illustrates a network control system 100 including such a network controller 110. As shown, the network control system 100 includes a management plane 105, a central controller 110, and multiple local controllers (also called the local control plane) 115-125 that operate on host machines 130-140. In addition, each of the host machines 130-140 includes a managed forwarding element (MFE) 145-155 that processes data traffic according to configuration information received from their respective controllers.

Though shown as a single entity, it should be understood that the management plane 105 may be implemented as a distributed system. Similarly, the central controller 110 may be part of a cluster of such central controllers that receive configuration data from the management plane 105. That is, the management plane 105 may include multiple computing devices that implement management plane functions, and a central control plane may include multiple central controllers (including the controller 110) that implement central control plane functions. In some embodiments, each centralized controller computer includes both management plane and central control plane functions (e.g., as separate applications on the computer).

The management plane 105 of some embodiments is responsible for receiving logical network configuration inputs 165 (e.g., through an application programming interface). Users (e.g., network administrators) may input logical network configuration data through, e.g., a command-line interface, a graphical user interface, etc. The configuration for each logical network configuration, in some embodiments, may include data defining one or more logical forwarding elements, such as logical switches, logical routers, etc. This configuration data may include information describing the logical ports (e.g., assigning MAC and/or IP addresses to logical ports) for these logical forwarding elements, how the logical forwarding elements interconnect, various service rules (such as distributed firewall rules), etc.

The management plane 105 receives the logical network configuration input 170 and generates desired state data that specifies how the logical network should be implemented in the physical infrastructure. In some embodiments, this data includes description of the logical forwarding elements and logical ports in a uniform format (e.g., as a set of database records or another format). When users provide configuration changes (e.g., creating or deleting logical entities, modifying properties of logical entities, etc.), the changes to the desired state are distributed as logical network updates 170 to the central controller 110 (or controllers).

Figure 2:
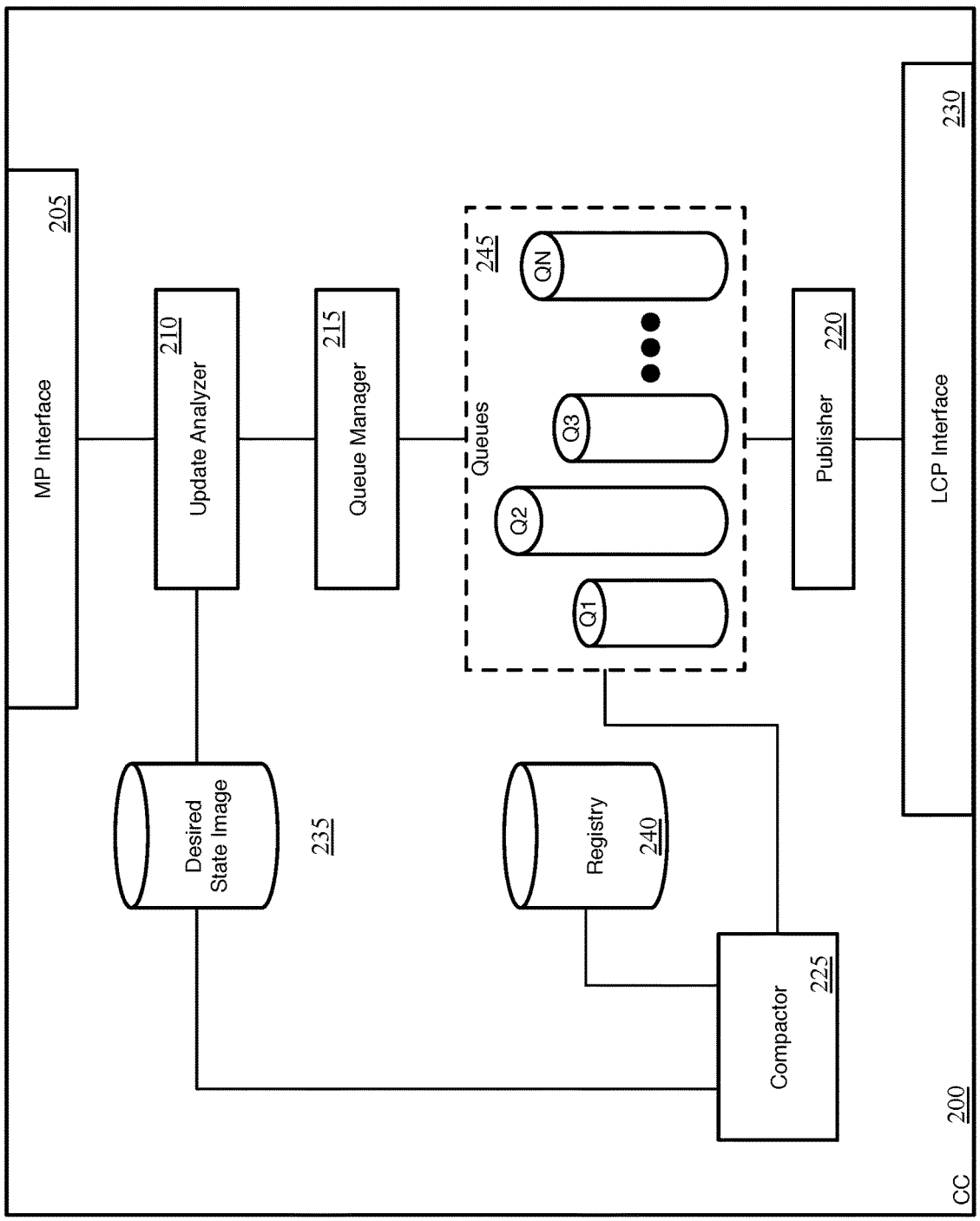
FIG. 2 conceptually illustrates the architecture of a central network controller of some embodiments.

The central controller 110 receives these updates 170 from the management plane, and is responsible for distributing the updates to the MFEs 145-155 that it manages (e.g., via the local controllers 115-125). In some embodiments, the network controller 110 is part of a central control plane cluster, with each controller in the cluster managing a different set of MFEs. The network controller receives the update 170 to the desired state and, based at least in part on the receipt of information received from the local controllers for its MFEs (referred to as runtime state), generates translated state updates for the local controllers 115-125. These translated state updates are placed in the distribution (or publication) queues for the local controllers. As explained further below, the separate queues allow for updates to be published at different rates to different local controllers, which may (for various reasons) process the updates at different speeds. In many cases, not all local controllers will need to receive a particular update. If a MFE does not implement the logical entity to which the update relates, then the central controller will not generate an update for the corresponding local controller's queue. In the example, the central controller 110 only generates and publishes the information in the update 170 to the local controllers 115 and 125 (via updates 175 and 180). FIG. 2, described below, conceptually illustrates the architecture of a central controller of some embodiments.

The local controllers 115-125 are responsible for translating the received updates into configuration data formatted for their respective MFEs 145-155. In some embodiments, the local controller is a daemon that operates in the virtualization software of the host machine, as does the MFE. In other embodiments, the local controller and MFE may operate within a VM that hosts multiple containers for one or more logical networks. In some such embodiments, a first local controller and MFE operate in the virtualization software on the host machine while a second local controller and MFE operate in the container host VM (or multiple such controllers/MFE operate in multiple container host VMs).

In addition, while in some embodiments all MFEs in the physical infrastructure are of the same type (and thus require data in the same format), in other embodiments the physical infrastructure may include multiple different types of MFEs. For instance, some embodiments include both hosts with kernel virtual machine (KVM) virtualization software with a flow-based MFE (e.g., Open vSwitch) and hosts with ESX virtualization software with a feature-base MFE. Such different types of MFEs require different data formats from the local controller. As such, the local controllers 115-125 of some embodiments are configured to translate the received updates into the specific format required by their MFEs.

As mentioned, FIG. 2 conceptually illustrates the architecture of a central network controller 200 of some embodiments, such as the network controller 110 of FIG. 1. The network controller 200 includes a management plane interface 205, an update analyzer 210, a queue manager 215, a publisher 220, a compactor 225, and a local control plane interface 230.

In addition, the network controller stores (e.g., in volatile memory, such as RAM) a desired state image 235, a registry 240, and a set of queues 245. As mentioned, the network controller of some embodiments uses shared entries representing the logical entities to which corresponding updates in multiple queues reference. In some embodiments, the controller stores two data structures with entries (e.g., objects) for logical entities. The controller stores (i) a desired state image 235 with an entry for each logical entity in the desired state of the logical networks and (ii) a registry 240 with an entry for each logical entity referenced by an update for at least one MFE (possibly including both updates currently in the queues 245 and updates that have been distributed from the queues 245 to the local controllers).

The desired state image 235 represents the current desired state of all of the logical networks, and thus has an entry for each logical switch, logical router, logical switch port, logical router port, etc. of each logical network. In addition, some embodiments create entries (e.g., additional objects) for each property of such a logical entity. Thus, a logical switch port might have a primary object as well as related objects for some or all of its properties that can be modified by configuration updates.

The registry 240, in some embodiments, includes a corresponding entry for each entry in the desired state image (and thus includes entries for all logical entities part of the current desired state of the logical networks) as well as entries for other logical entities that may be referenced by the updates in the queues 245. When a first update specifies the creation of a logical entity and a later update specifies the deletion of that logical entity, the corresponding entry or entries will be removed from the desired state image 235. However, because the updates in the queues 245 refer to shared entries in the registry 240, the entry or entries for the logical entity are not removed from the registry 245.

In addition to the desired state image 235 and registry 240, the network controller 200 stores the queues 245, with one queue for each MFE managed by the network controller. Each of these queues stores a sequence of updates, which the network controller publishes from the queue to the corresponding local controller. These updates, in some embodiments, are structured as references (e.g., pointers) along with metadata specifying the modification(s) to be made to the logical entity corresponding to the referenced entry. For instance, an update to remove a logical switch would have a reference to the entry for the logical switch along with metadata specifying to delete the corresponding logical entity. An update to change the name of the logical switch would have a reference to the same entry (or a related entry for the logical switch name) with metadata specifying the new value for the name property. Having numerous updates in separate queues reference the same entry reduces the memory used by the network controller, as the entries (objects) typically occupy much more memory than the references (pointers) to the objects. This memory load may be a problem if one or more of the queues backs up significantly. Furthermore, multiple separate updates in a queue that modify the same logical entity will also refer to the same shared entry, thereby further saving space.

The management plane interface 205 handles interactions with the management plane (which may be operating, e.g., as a separate application on the same physical machine as the central controller and/or on one or more distinct physical machines). The central controller receives changes in the desired state of one or more logical networks through this management plane interface 205.

The update analyzer 210 receives updates to the desired state and determines whether to add or remove objects from the desired state image 235 and/or registry 240. For instance, when an update specifies to create a new logical entity, the update analyzer 210 creates one or more objects in the desired state image 235 and the registry 240 for the logical entity. Some embodiments create a single object in each of the two data structures, while other embodiments create additional objects to represent the various properties of the logical entity. On the other hand, when an update specifies to delete an existing logical entity, the update analyzer 210 removes the corresponding object or objects from the desired state image 235. However, until the update deleting the logical entity has been published to all of the requisite local controllers, the corresponding object or objects are left in the registry 240.

The queue manager 215 of some embodiments generates the translated state updates for the queues 245 based on the desired state updates received from the management plane as well as runtime state information received from the local controller. The runtime state may identify on which MFEs different logical entities are realized as well as other information indicating the realization of the desired state in the physical infrastructure. The queue manager 215 is responsible for identifying into which queue the updates should be placed based on data stored by the network controller identifying the span for a given logical entity (i.e., the MFEs that need configuration data for a particular logical entity). The queue manager 215 generates a reference (e.g., a pointer) to the appropriate object in the registry 240 for each update placed in a separate queue, and also provides the metadata along with the reference that identifies the modifications to make to the logical entity (e.g., create, delete, change value of property, etc.).

The publisher 220 is responsible for distributing data from the queues through the local control plane interface 230 to the appropriate local controllers. In some embodiments, the central controller 200 has a separate channel with each of the local controllers that it manages via the interface 230. When the central controller receives indication through this communication channel that the local controller has processed an update, the publisher 220 pushes the next update from the corresponding queue to the local controller through the local controller interface 230.

The updates may be distributed from different queues 245 at different speeds. This may occur due to a local controller operating slowly, connectivity between the network controller 200 and a local controller being cut off for a period of time, different numbers of updates being distributed to different local controllers, etc. Thus, while an update to delete a particular logical port may have been distributed to twenty local controllers, the update could still remain in the queue of a twenty-first local controller, and thus the object referenced by these twenty-one updates needs to remain in the registry.

While using shared objects in the second data structure does reduce the overall memory load on the network controller, both the second data structure and any very slow update queues could grow unendingly large without a procedure in place to limit these structures. Thus, the compactor 225 of some embodiments performs a queue compaction procedure that guarantees an upper bound on the overall memory occupied by the combination of the first data structure, the second data structure, and all of the individual update queues (for a bounded number of desired state logical entities). That is, the overall memory load is guaranteed to be a bounded function of the memory load of the first data structure (which is bounded according to the number of logical entities in the desired state at any given time).

The compactor 225 of some embodiments both compacts updates within the queues and removes unnecessary entries from the registry 240. While the compaction procedure is performed continuously in some embodiments, in order to save processing resources other embodiments perform the compaction process whenever the registry 240 reaches a specified size. For example, some embodiments perform the compaction process whenever the registry 240 reaches a threshold size relative to the desired state image 235, such as whenever the registry 240 has twice as many entries as the desired state image 235.

To compact updates within the queues, the compactor 225 identifies sets of updates within a queue that reference the same entry and combines these into a single update. That is, rather than two (or more) pointers with separate sets of metadata specifying different modifications to the referenced object, the updates are combined into a single pointer with the metadata combined into a larger set of metadata. In certain cases, the update can be removed from the queue altogether. Specifically, when a first update referencing an object specifies to create the corresponding logical entity and a last update referencing the same object specifies to delete the corresponding logical entity, these updates (and any intervening updates referencing the same object) can be removed from the queue. Similarly, any other pair of updates that specifically negate each other (e.g., a first update adding X to a value of a property and a second update subtracting X from the value of the same property) are removed in some embodiments. On the other hand, a first update adding X to a value of a property and a second update adding Y to the value of the property would be combined into a single update specifying to add X and then add Y to the value of the property.

The compactor 225 additionally, as noted, removes unnecessary objects from the registry, thereby limiting the amount of memory occupied by the registry. A particular object may be removed from the registry 240 so long as (i) the particular entry does not have a corresponding object in the desired state image 235 (i.e., the corresponding logical entity is not part of the current desired network state) and (ii) no updates remain in any of the queues 245 that reference the particular object. In some embodiments, the compactor 225 removes objects from the registry 240 whenever these conditions are met, not only as part of the compaction process. However, the compaction process may result in the removal of updates such that the second condition is met for additional objects.

The above introduces the generation of flow entries for implementing service rules. In the following, Section I describes adding updates to the various local controller queues, while Section II describes the compaction process of some embodiments. Section III then describes the electronic system with which some embodiments of the invention are implemented.

I. Adding Updates to Queues

The network controller of some embodiments receives updates to the desired state of one or more logical networks implemented by the managed physical infrastructure and, based at least in part on the receipt of runtime state from the local controllers, generates translated state updates to distribute to the local controllers. The controller adds these translated state updates to the distribution (or publication) queues for the local controllers. As mentioned, in some embodiments the network controller uses shared objects representing the logical entities to which corresponding updates in multiple queues reference. In some embodiments, the controller stores two data structures with objects for the logical entities. Specifically, the controller stores (i) a desired state image with an object for each logical entity in the desired state of the logical networks and (ii) a registry with an object for each logical entity referenced by at least one update (including both updates currently in the queues and updates that have been distributed from the queues to the local controllers).

Figure 3:
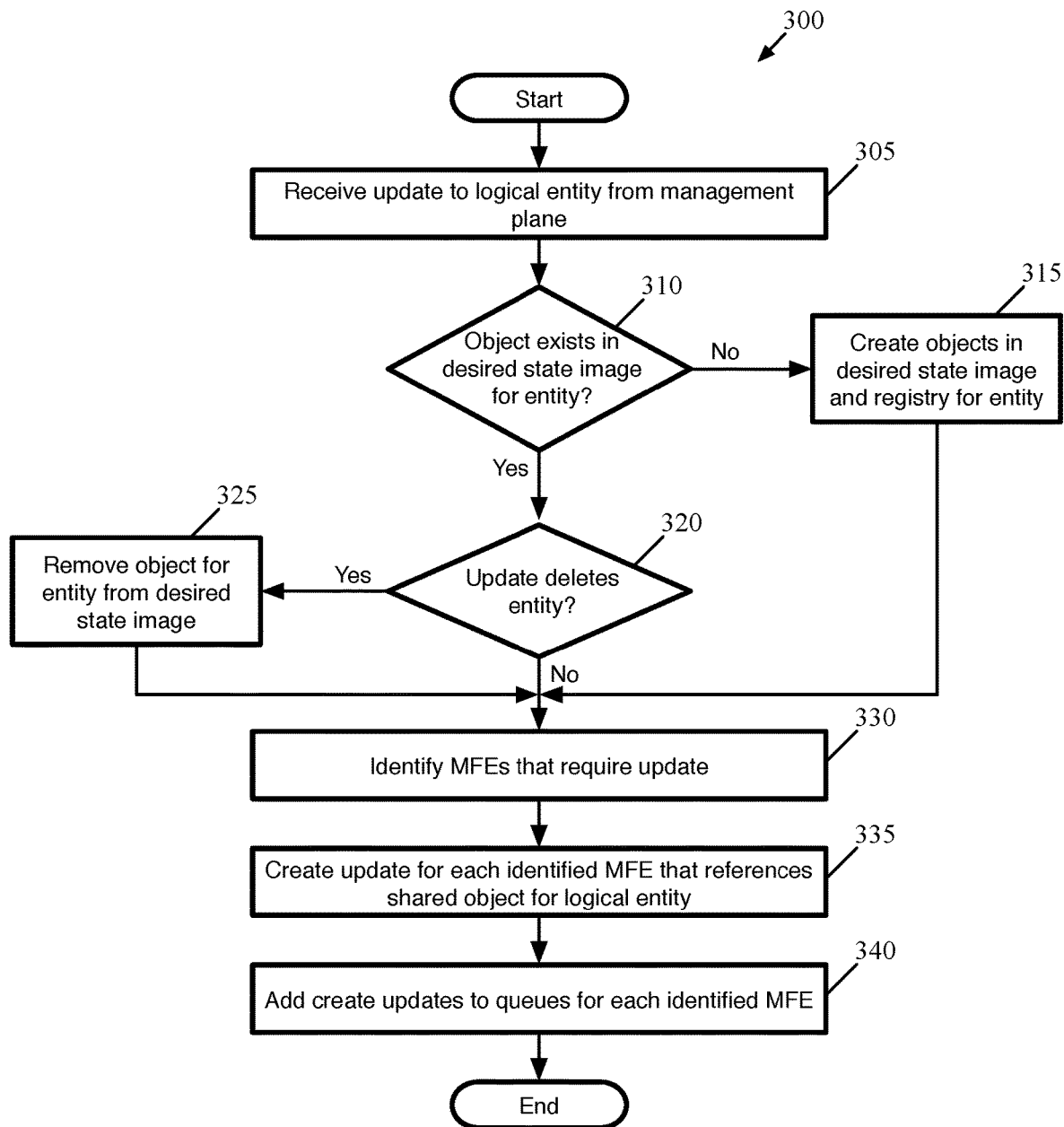
FIG. 3 conceptually illustrates a process for receiving desired state updates and generating translated state updates to place in the local controller queues.

FIG. 3 conceptually illustrates a process 300 for receiving desired state updates and generating translated state updates to place in the local controller queues. The process 300, in some embodiments, is performed by a centralized network controller that manages numerous MFEs operating on numerous host machines. Each host machine includes one or more MFEs (e.g., software switches and/or routers) that are each configured to implement one or more logical networks based on the translated state updates. The MFE or MFEs on a host machine are managed by a local controller, also operating on the host machine. In some embodiments, both the MFE(s) and the local controller operate within the virtualization software of the host machine.

The centralized network controller may be one of several centralized controllers operating in a cluster, with each of the centralized controllers receiving desired state updates and performing the process 300 (or a similar process). Each centralized controller, in some embodiments, manages a different set of MFEs (that is, each MFE is assigned to one centralized controller, which provides the updates for the MFE to its local controller).

As shown, the process 300 begins by receiving (at 305) an update to a logical entity from the management plane. As described above, the management plane generates the desired state updates based on, e.g., configuration input from a network administrator to modify the logical network configuration. These updates may add or remove logical forwarding elements (e.g., logical switches, logical routers) or logical ports, modify properties of these logical entities. Modifying properties of a logical port or logical forwarding element could involve changing the name of that logical entity, changing a value of some other property, adding or removing service rules (e.g., distributed firewall rules) that relate to the logical entity, etc.

A single desired state update received from the management plane might include updates to numerous logical entities. For instance, an administrator might create a new logical switch with numerous logical ports, each of which would have to be created. However, the process 300 relates to a single logical entity. In some embodiments, the network controller performs this process (or a similar process) for each logical entity that is updated by the changes to the desired state.

The process 300 determines (at 310) whether an object exists in the desired state image for the logical entity modified by the update received at 305. If an object exists in the desired state image, then a corresponding object will also exist in the registry (though the converse is not necessarily true). Similarly, if no object exists in the desired state image for a logical entity, but an update is received pertaining to that logical entity, then (i) the update should be to create the logical entity and (ii) the registry should also not have an object for the logical entity. While the registry will store objects that no longer have corresponding objects in the desired state image, these should be objects that have already been deleted according to the desired state.

Thus, when the desired state image does not store an object for the logical entity to which the update pertains, the process creates (at 315) an object in the desired state image and an object in the registry pertaining to the logical entity. The desired state image allows the network controller to keep track of the desired state of the logical networks implemented within the physical infrastructure, and thus objects are created for each logical entity with the properties of that logical entity. The registry of some embodiments stores the objects to which state updates actually refer, and thus the process creates an object in the registry for each object created in the desired state image.

When the desired state image already stores an object for the logical entity (i.e., the updated does not create a new logical entity), the process determines (at 320) whether the received update deletes the logical entity. If the update deletes the logical entity, then the process removes (at 325) the object corresponding to the logical entity from the desired state image. However, the network controller does not remove the corresponding object from the registry, as both the translated state updates generated for the received update and any other updates in the queue for the logical entity will refer to that registry object. In this way, the registry enables the updates to refer to shared objects while the desired state image is kept up to date to match the desired state according to the management plane.

The process 300 then identifies (at 330) the MFEs that require the update. In some embodiments, the central network controller (or controller cluster) calculates the span for each logical entity in each logical network, based on the location of the end machines (e.g., virtual machines (VMs), containers, etc.) and the structure of the logical network. In order for the MFEs to perform first-hop processing (i.e., performing all or most of the logical processing for a packet at the first hop), each MFE (or set of MFEs on a host machine) should be configured with all potentially needed information for the logical networks of the end machines on that host machine. Thus, for example, the span of a first logical switch with five connected VMs will be not only the host machines of those five VMs, but also (the host machines for VMs that connect to other logical switches that connect to the same router as the first logical switch. Furthermore, the logical switch may span to gateway machines that perform processing for the logical router, as well as potentially other MFEs. Thus, the number of MFEs that require an update to a particular logical entity may be quite large.

Next, the process 300 creates (at 335) an update, for each identified MFE, that references the shared object in the registry for the logical entity. That is, the network controller generates a separate update for each MFE (local controller) to which the received desired state update will be distributed. In some embodiments, these updates are structured as pointers to the shared object, along with metadata specifying the modification(s) to be made to the logical entity. For instance, an update to remove a logical router would have a reference to the registry object for the logical router along with metadata specifying to delete the object. An update to change the name of the logical router would have a reference to the same object (or a related object for the logical router name) with metadata specifying the new value for the name property. Having numerous updates in separate queues reference the same object reduces the memory used by the network controller, as the objects typically occupy much more memory than the pointers.

The process then adds (at 340) the created updates to the queues for each identified MFE (local controller). The process then ends. The queues are organized as first-in-first-out structures, so that the updates are published to their respective local controllers in the order in which the network controller receives the desired state updates.

Figure 4:
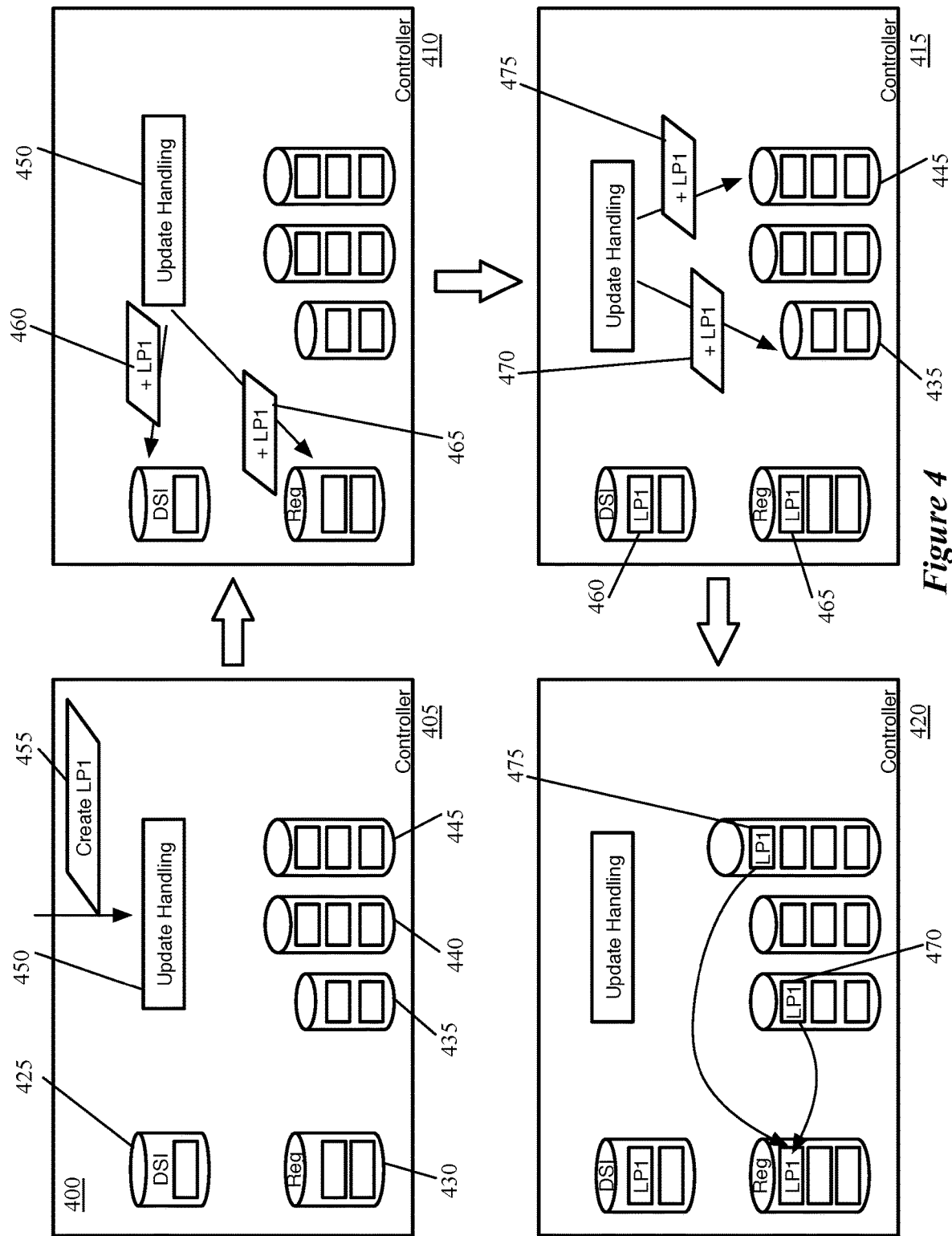
FIGS. 4 and 5 conceptually illustrate examples of a network controller receiving updates and managing its desired state image, registry, and local controller queue data structures according to some embodiments.
Figure 5:
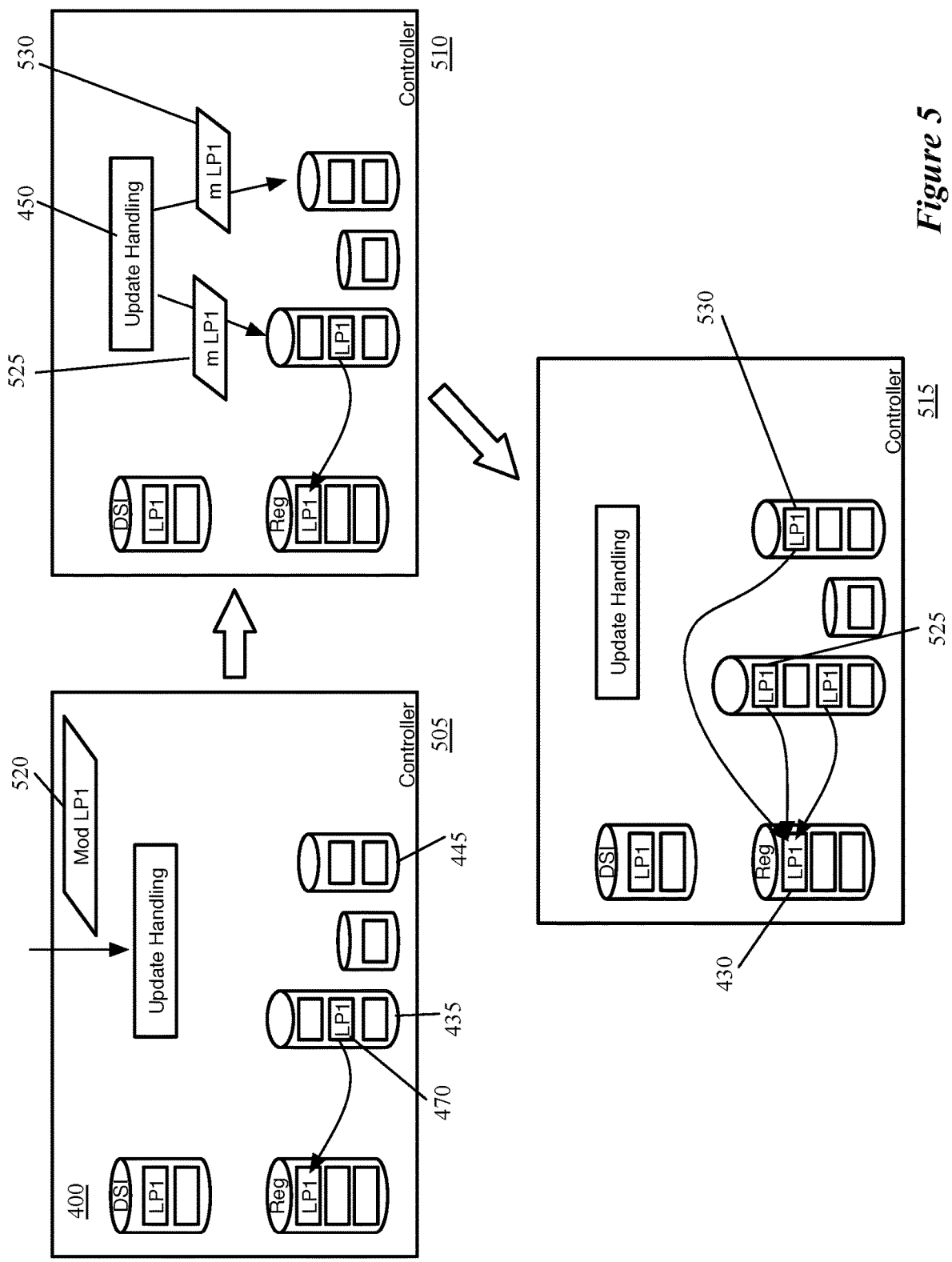

FIGS. 4 and 5 conceptually illustrate examples of a network controller 400 receiving updates and managing its desired state image, registry, and local controller queue data structures according to some embodiments. Specifically, FIG. 4 illustrates the network controller 400 receiving and processing an update to add a logical port over four stages 405-420.

As shown at the first stage 405, the network controller 400 stores a desired state image 425, a registry 430, and a set of update queues 435-445 for different local controllers located at different machines. While this example shows only three update queues, it should be understood that in many cases a centralized network controller will provide updates to many (e.g., hundreds or thousands) of local controllers, and will store an update queue for each one. In addition, the controller 400 includes an update handling module 450, which performs the functionality of the update analyzer 210 and queue manager 215 of the network controller 200 of FIG. 2. That is, the update handler 450 performs the process 300 or a similar process to manage the desired state image 425 and registry 430 based on received updates and to generate updates and add them to the queues 435-445.

In the first stage 405, the network controller 400 receives an update 455 from the management plane (not shown). The update 455 specifies to create a new logical port LP1. The logical port update 455 would, in some embodiments, include information about the logical port such as the logical forwarding element (e.g., logical router or logical switch) to which the logical port LP1 belongs, the network addresses (e.g., IP and MAC addresses) associated with the logical port, etc. In some embodiments, the update indicates to which MFE the port belongs (i.e., on which host machine the end machine attached to LP1 operates); in other embodiments, this information is received from the local controller that manages that MFE.

The second stage 410 illustrates that the update handler 450 adds a first object 460 to the desired state image 425 and a second object 465 to the registry 430 for the newly created logical port LP1. Though shown as a single object, in some embodiments multiple objects are added for each logical entity, including a primary object as well as related objects for certain properties of the logical entity. As a result of adding these objects, both the desired state image 425 and registry 430 are larger in the third stage 415 than in the first stage 405.

In the third stage 415, the update handler 450 generates updates 470 and 475 for the queues 435 and 445, respectively. The update handler 450 would have determined that the span of the new logical port included the MFEs corresponding to the first queue 435 and the third queue 445, but not the second queue 440. These updates 435 include references (e.g., pointers) to the object 465 stored in the registry 430, and also include metadata about the logical port (e.g., a create action, and other parameters received with the update 455). As shown in the fourth stage 420, the queues 435 and 445 have increased in size by one update, while the second queue 440 stays static. These updates (labeled LP1) both point to the same object 465 in the registry 430 at this stage.

FIG. 5 illustrates the network controller 400 receiving and processing another update to modify the logical port LP1 over three stages 505-515. The first stage 505 illustrates the controller 400 after some amount of time has elapsed since stage 420 of FIG. 4. The controller has received at least two updates during this time, as the queue 435 has an additional update that has been placed in the queue after the update 470 to create the logical port LP1. The controller has already published the update 475 from the queue 445 to the appropriate local controller, and currently stores two additional updates received after that one. In addition, at the first stage 505 the network controller receives an update 520 specifying modifications to the logical port LP1 (e.g., a different IP address, a change to its name, a firewall rule applying to that port, etc.

At the second stage 510, the update handler 450 generates updates 525 and 530 for the queues 435 and 445, respectively. As these updates also pertain to LP1, they will be sent to the same local controller queues as the first update (assuming there hasn't been any migration of the pertinent end machines from one host to another in the interim). These updates 525 and 530 are structured similarly to the updates 470 and 475, with pointers to the registry object 465, with metadata indicating the specified modifications to the logical port. In the third stage 515, the queues 435 and 445 have increased in size by one update, with the new updates 525 and 530 pointing to the registry object 465 along with the update 470 that is still in the queue 435.

II. Compacting Update Queues and Registry

While using shared objects in the registry does reduce the overall memory load from the publication functions of the network controller, both the registry and any very slow update queues could grow unendingly large without a procedure in place to limit these structures. Thus, some embodiments use a queue compaction procedure that guarantees an upper bound on the overall memory occupied by the combination of the desired state image, the registry, and all of the individual update queues (for a bounded number of desired state logical entities). That is, the overall memory load is guaranteed to be a bounded function of the memory load of the desired state image (which is bounded according to the number of logical entities in the desired state at any given time).

Figure 6:
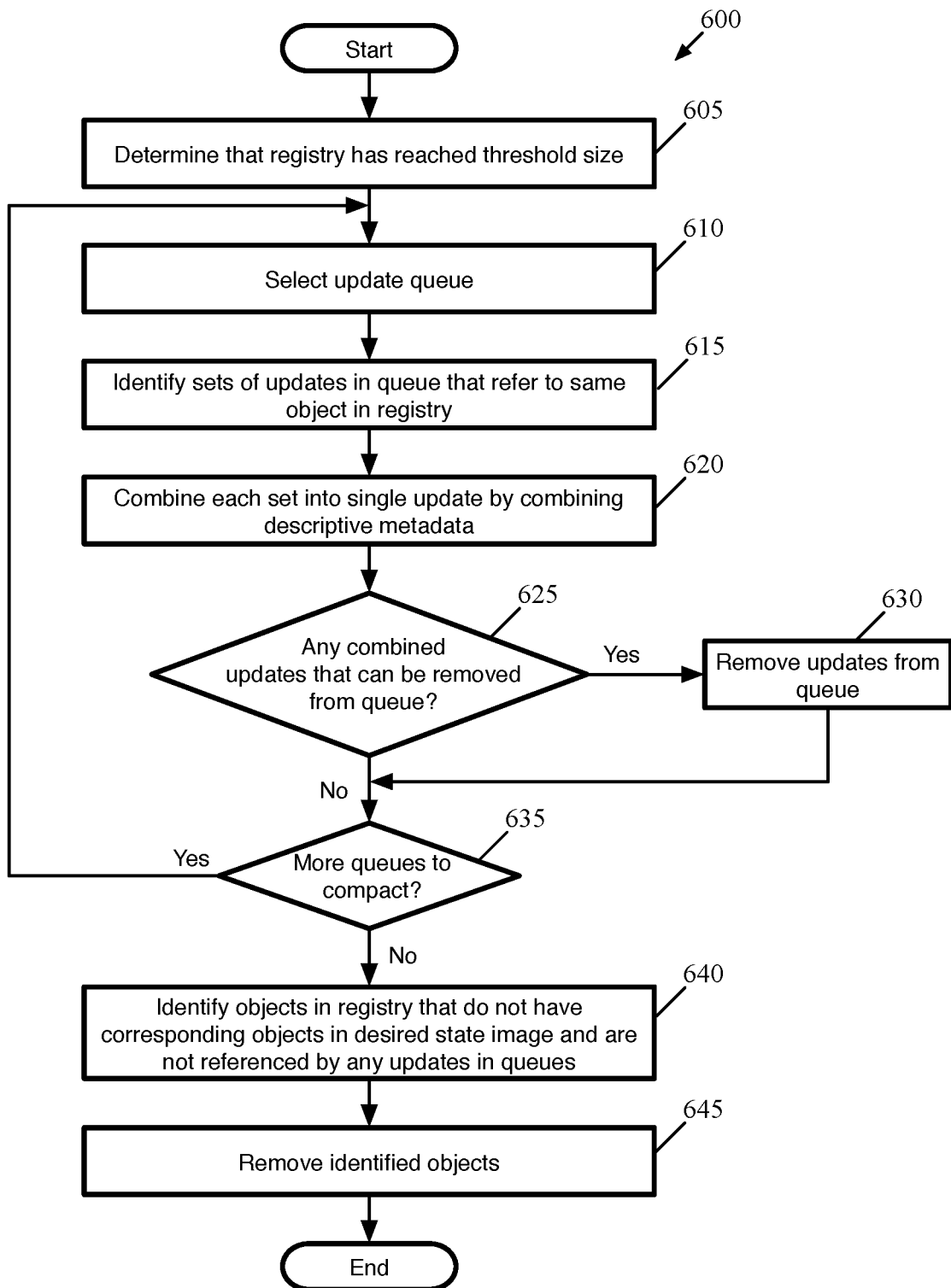
FIG. 6 conceptually illustrates a process of some embodiments for performing queue and registry compaction to manage the memory load on a network controller.

FIG. 6 conceptually illustrates a process 600 of some embodiments for performing this queue and registry compaction to manage the memory load on the network controller. The queue compaction process is performed by the network controller in some embodiments, upon reaching certain conditions. This process 600 will be described in part by reference to FIG. 7, which conceptually illustrates a network controller 700 performing compaction over three stages 705-715. The network controller 700 includes a desired state image 720, a registry 725, and four queues 730-745, functioning as described above.

As shown, the process 600 begins by determining (at 605) that the registry has reached a threshold size. The queue compaction procedure of some embodiments both compacts updates within the queues and removes unnecessary entries from the registry. While the compaction procedure is performed continuously in some embodiments, in order to save processing resources, other embodiments perform the compaction process whenever the registry reaches a specified size. For example, some embodiments perform the compaction process whenever the registry reaches a threshold size relative to the desired state image, such as whenever the registry has twice as many entries as the desired state image. In this case, the process 600 begins when the registry reaches this threshold.

Figure 7:
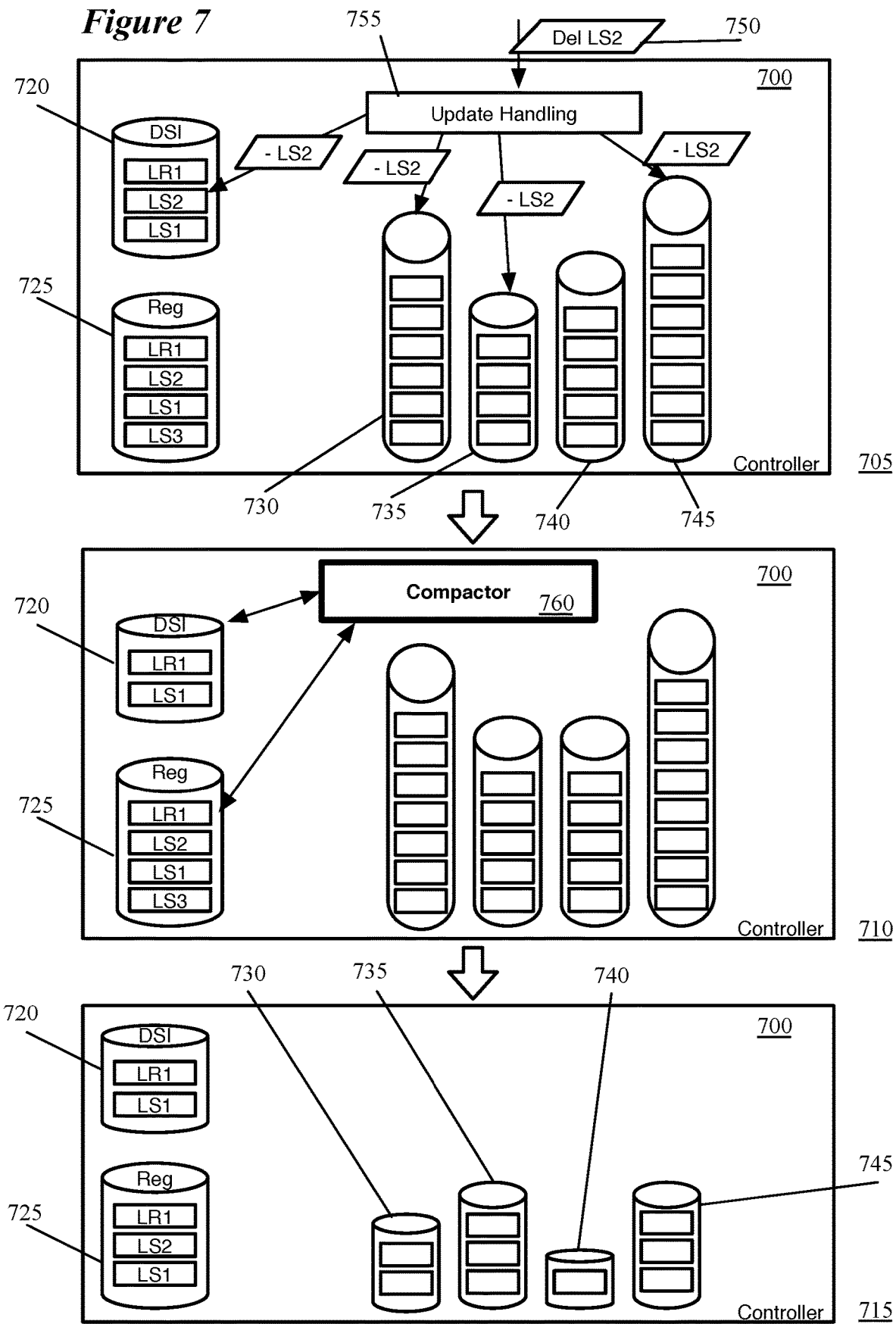
FIG. 7 conceptually illustrates a network controller performing compaction.

In the first stage 705 of FIG. 7, the network controller 700 receives an update 750 that specifies to delete a logical switch LS2. As shown, at this stage, the desired state image 720 includes three objects, for two logical switches and a logical router (it should be understood that this is a simplistic representation, and that a typical desired state image could include thousands of objects). The registry 725 includes four objects, three of which correspond to the objects in the desired state image 720. The fourth object, for a third logical switch LS3, refers to an object that was previously deleted from the desired state but for which updates may still remain in one or more of the queues 730-745.

As a result of receiving this update 750, the update handler 755 (i) removes the object for LS2 from the desired state image 720 and (ii) adds updates to each of the queues that correspond to local controllers requiring these updates (i.e., based on the span of the logical entity being updated). In this case, updates are added to the queues 730, 735, and 745. The second stage 710 illustrates that the compactor 760 of the network controller 700 determines that after the object for LS2 is removed from the desired state image 720, the registry 725 has become twice the size of the desired state image 720. As a result, the compactor 760 begins the queue and registry compaction process.

Returning to FIG. 6, the process 600 then selects (at 610) an update queue. Different embodiments may select the update queues in different orders (e.g., randomly, based on size, based on names used to identify the different local controllers, etc.). Furthermore, it should be understood that this figure illustrates a conceptual process, and that the processing of the update queues is not necessarily performed serially (i.e., one at a time) as shown in the figure. Instead, some embodiments perform processing to compact the update queues in parallel, or at least partially so.

Next, the process 600 identifies (at 615) sets of updates in the selected queue that refer to the same object in the registry. The process combines (at 620) each such set into a single update by combining the descriptive metadata from the set of updates. That is, if two (or more) pointers in the same queue have separate sets of metadata specifying different modifications to the same referenced object, the compaction procedure combines these updates into a single pointer with all of the metadata from the multiple individual updates. For instance, a first update might create a logical entity and a second update modifies a property of that logical entity. These updates would not necessarily be directly next to each other in the queue, but might instead be separated by updates relating to other logical entities. Detailed examples of this queue compaction will be described below by reference to FIGS. 8-10.

The process 600 then determines (at 625) whether any of the combined updates can be removed from the currently selected queue altogether, and removes (at 630) any such updates from the queue. In certain cases, the network controller determines that the combined update does not need to be sent to the local controller at all, because the end result of the combined metadata specifies a no-op. For instance, when a first update referencing an entry specifies to create the corresponding logical entity and a last update referencing the same entry specifies to delete the corresponding logical entity, these (and any intervening updates referencing the same entry) updates can be removed from the queue, as sending these to the local controller does not serve a purpose. This typically occurs when a queue has a backup (e.g., because a local controller/MFE is slow to implement changes), or when an administrator quickly creates and then deletes a logical entity.

Similarly, any other pair of updates that specifically negate each other are removed in some embodiments. As an example, a first update adding X to a value of a property and a second update subtracting X from the value of the same property results in no change to the value of the property. However, if any additional updates are made to the logical entity then the update cannot be removed from the queue. Furthermore, a first update adding X to a value of a property and a second update adding Y to the value of the property would be combined into a single update specifying to add X and then add Y to the value of the property.

After compacting the updates in the currently selected queue, the process 600 determines (at 635) whether additional queues remain to compact. If so, the process returns to 610 to select a next queue. As noted above, this process is conceptual, and many threads compacting multiple queues in parallel may be carried out in some embodiments. Returning to FIG. 7, in the third stage 715 the queues have grown significantly smaller. The first queue 730 has gone seven updates to two updates, the second queue 735 has gone from five updates to three updates, the third queue 740 has gone from five updates to one update, and the fourth queue 745 has gone from eight updates to three updates. This could include both compacting multiple updates for a logical entity into a single update as well as completely removing updates (e.g., if any of the queues still had the update creating LS2 or LS3, in addition to the updates removing these logical switches.

Returning to FIG. 6, after all of the queues have been compacted (both combining updates and removing updates), the process 600 identifies (at 640) objects in the registry that (i) do not have corresponding objects in the desired state image and (ii) are not referenced by any updates to the queues. The process then removes (at 645) these identified objects from the registry, and ends. These identified objects are those that correspond to logical entities which have been removed from the desired state and for which those updates deleting the logical entity have been published from all of the queues (or deleted from the queue because the update creating the logical entity was never published). In some embodiments, the network controller removes objects from the registry whenever these conditions are met, not only as part of the compaction process. However, the compaction process may result in the removal of updates such that the second condition is met for additional objects.

In FIG. 7, the third stage 715 also shows that the compactor 760 removed an entry from the registry 725, so that it has three objects rather than four objects (i.e., the object for LS3 was removed). In this example, if each object uses 10 kB of space and each update (pointer) uses 8 bytes of space, then the total size of the data structures was 60 kB of objects and 200 bytes of updates before compaction. After compaction, this has been reduced to 50 kB of objects and 72 bytes of updates. While this may not seem large (because each update pointer does not occupy a large amount of memory), in a real-world scenario hundreds of objects could be removed (500 objects would reduce the memory usage by 5 MB) and thousands (or even millions) of updates removed/compacted over a thousand queues (10000 pointes would reduce memory usage by 80 kB).

Figure 10:
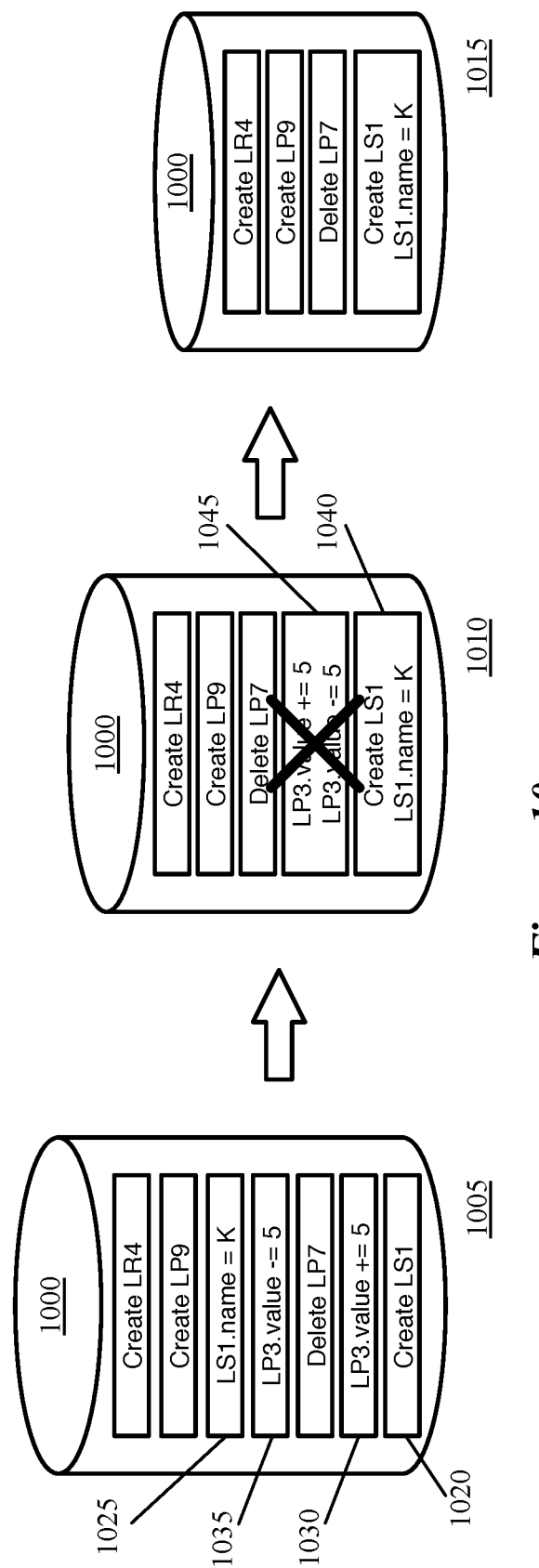

FIGS. 8-10 provide examples of queue compaction, some of which result in the removal of updates for different reasons. FIG. 8 specifically illustrates an update queue 800 that is compacted and from which a set of updates is deleted, over three stages 805-815. In the first stage (pre-compaction), the queue 800 contains eight separate updates pertaining to six different logical entities (two logical switches LS1 and LS3, a logical router LR4, and three logical ports LP3, LP7, and LP9). These eight separate updates include three updates 820-830 that pertain to the logical switch LS1: a first update 820 creating the logical switch, a second update 825 assigning a name to the logical switch, and a third update 830 deleting the logical switch.

In the second stage 810, after compaction, these three updates 820-830 have been combined into a single update 835, while the other five updates remain the same. In addition, this update 835 starts with the creation of the logical switch and finishes with the deletion of the logical switch. As such, the update can be removed, because there is no benefit in having the update published to the local controller. Thus, the third stage 815 shows that the update is removed from the queue 800. This deletion provides memory savings at the centralized controller as well as processing savings at the local controller that no longer needs to process this update. In addition, there is the possibility that the object corresponding to LS1 will be removed from the registry.

FIG. 9 illustrates an update queue 900 that is compacted without deleting any updates, over two stages 905-910. In this example, the first stage shows an update queue with seven updates pertaining to five different logical entities (one logical switch LS1, one logical router LR4, and three logical ports LP3, LP7, and LP9). Two of the updates 915 and 920 pertain to the logical switch LS1 and two of the updates 925 and 930 pertain to the logical port LP3. Thus, each of these pairs of updates is compacted into a single update in the second stage 910. The single update 935 for LS1 specifies to create and name that logical switch, while the single update for 940 for LP3 specifies to create and name the logical port. Neither of these updates can be removed, as they need to be propagated to the local controller.

FIG. 10 illustrates an update queue 1000 that is compacted and from which a set of updates is deleted, over three stages 1005-1015. In the first stage 1000, the update queue includes seven updates, pertaining to five logical entities. Two of the updates 1020 and 1025 pertain to the logical switch LS1 and two of the updates 1030 and 1035 pertain to the logical port LP3. Thus, each of these pairs of updates is compacted into a single update in the second stage 1010. The single update 1040 for the logical switch LS1 specifies to create the logical switch and provide a name for the logical switch. The single update 145 for the logical port LP3 first adds five to a value pertaining to that logical port and then subtracts five to the same value. Because this results in a no-op (add zero), some embodiments remove the update from the queue, and thus the third stage 1015 illustrates the queue 1000 as storing only four updates.

Figure 11:
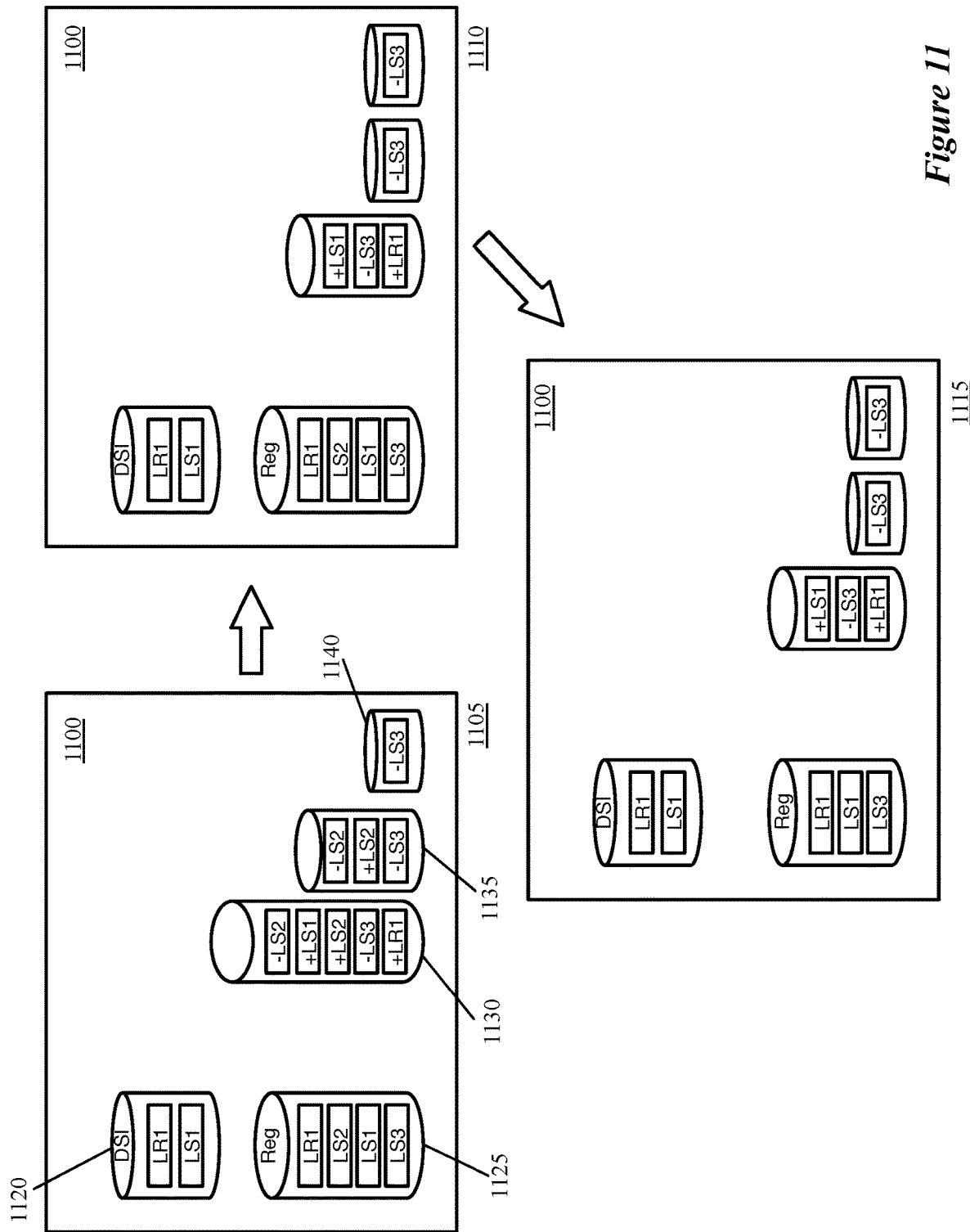
FIG. 11 conceptually illustrates a controller as updates are compacted and objects are then deleted from the registry.

FIG. 11 conceptually illustrates a controller 1100 over three stages 1105-1115 in which updates are compacted and objects are then deleted from the registry. The first stage 1105 illustrates that the network controller 1100 includes a desired state image 1120, a registry 1125, and three queues 1130-1140. The desired state image 1120 includes objects for logical switch LS1 and logical router LR1, while the registry 1125 includes objects for logical router LR1 and three logical switches LS1, LS2, and LS3. The queues include various updates, which for simplicity relate to either creation or deletion of logical entities.

The second stage 1110 illustrates the controller 1100 after the queues 1130-1140 have been compacted. The first queue 1130 had updates to create logical router LR1, delete logical switch LS3, create logical switch LS2, create logical switch LS1, and delete logical switch LS2. As a result of compaction, the creation and deletion of logical switch LS2 has been removed from the queue 1130. The second queue 1135 had updates to delete logical switch LS3, create logical switch LS2, and delete logical switch LS2. As with the first queue 1130, the compaction removes the creation and deletion of logical switch LS2 from the queue 1135. The third queue 1140 stays the same, as it only had one update in the first place (to remove logical switch LS3).

In the third stage 1115, the controller 1100 has removed the object for logical switch LS2 from the registry 1125. This is possible because (i) there is no object in the desired state image 1120 for logical switch LS2 and (ii) none of the queues have updates referring to the object for logical switch LS2 any longer, as a result of compaction. The logical switch LS3, on the other hand, satisfies the first criteria (no corresponding object in the registry), but its object cannot be removed from the registry because the updates for deleting this logical switch still remain in some of the queues. However, once these updates are published from the three queues 1130-1140, then the corresponding object can be removed from the registry 1125.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
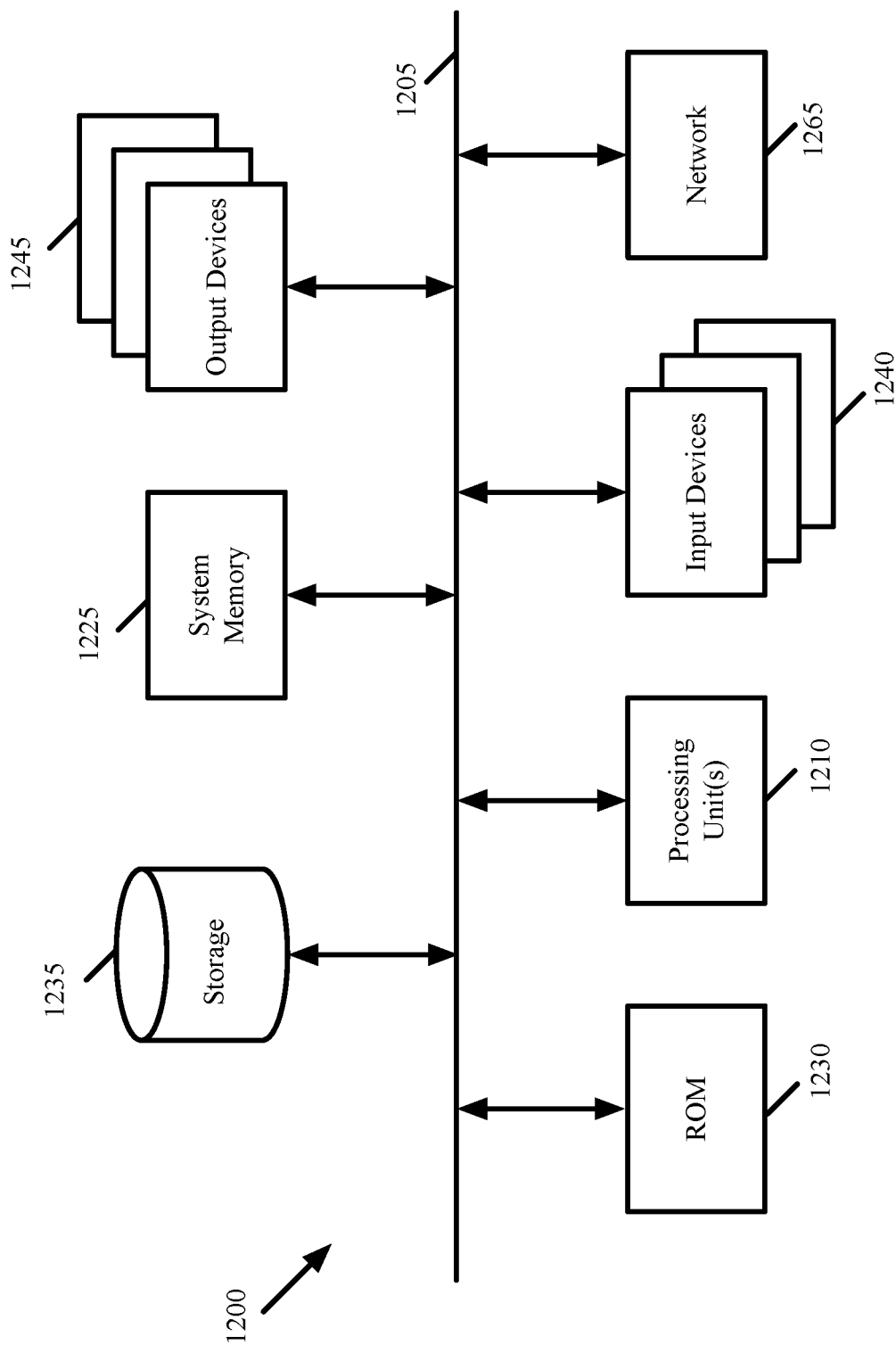
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a network controller that manages a plurality of managed forwarding elements (MFEs), the MFEs implementing a plurality of logical networks each comprising a plurality of logical entities, a method comprising:
    storing (i) a first data structure comprising an entry for each logical entity in a desired state of the plurality of logical networks and (ii) a second data structure comprising an entry for each logical entity referred to by an update for at least one MFE;
    upon receiving updates specifying modifications to the logical entities, adding separate updates to separate queues for the MFEs that require the update, the separate updates referencing the logical entity entries in the second data structure; and
    when the second data structure reaches a threshold size in comparison to the first data structure, compacting the updates in at least one of the separate queues so that each queue has no more than one update referencing a particular logical entity entry in the second data structure.

2. The method of claim 1, wherein each entry in the first data structure is an object created upon receiving a desired state update from a management controller creating a new logical entity.

3. The method of claim 2 further comprising removing a particular object corresponding to a particular logical entity from the first data structure upon receiving an update from the management controller deleting the particular logical entity.

4. The method of claim 2, wherein each entry in the second data structure is an object created upon adding a first update for a corresponding logical entity to one of the separate queues.

5. The method of claim 1, wherein compacting the updates in a particular queue comprises:
    identifying first and second updates in the particular queue that refer to a particular entry in the second data structure;
    adding metadata from the second update, describing modifications to make to the logical entity corresponding to the particular entry, to the first update; and
    removing the second update from the particular queue.

6. The method of claim 1, wherein compacting the updates comprises:
    identifying a particular logical entity with an entry in the second data structure but no entry in the first data structure;
    when a particular queue includes an update to create the particular logical entity, removing the update to create the particular logical entity and any other updates that refer to the particular logical entity from the queue.

7. The method of claim 6, wherein the update to create the particular logical entity refers to a first entry in the second data structure, wherein at least one of the other removed updates refers to a second, different entry in the second data structure.

8. The method of claim 7, wherein the at least one other removed update refers to an entry for a property of the particular logical entity.

9. The method of claim 1 further comprising removing a particular entry from the second data structure when (i) no corresponding entry exists in the first data structure and (ii) no update in any of the separate queues references the particular entry.

10. The method of claim 9, wherein the removal of the particular entry is performed after compacting the updates.

11. The method of claim 1, wherein the logical entities comprise logical forwarding elements and logical ports of logical forwarding elements.

12. The method of claim 1, wherein the plurality of MFEs execute on host machines with local controllers executing alongside the MFEs on the host machines.

13. The method of claim 12 further comprising distributing the updates from the separate queues to the local controllers based on availability of the local controllers.

14. The method of claim 13, wherein a first update specifying a particular modification is distributed from a first queue to a first local controller before a second update specifying the particular modification is distributed from a second queue to a second local controller based on a backup at the second local controller.

15. A non-transitory machine readable medium storing a network controller application which when executed by at least one processing unit manages a plurality of managed forwarding elements (MFEs), the MFEs implementing a plurality of logical networks each comprising a plurality of logical entities, the network controller application comprising sets of instructions for:
 receiving an update specifying a set of modifications to a logical entity of a particular logical network, wherein the network controller stores a set of objects for the logical entity;
 identifying the MFEs to which to propagate the update; and
 adding separate updates to separate queues for each identified MFE, wherein the updates added to the queues for each identified MFE reference the same set of objects for the logical entity.

16. The non-transitory machine readable medium of claim 15, wherein the logical entities comprise logical forwarding elements and logical ports of logical forwarding elements.

17. The non-transitory machine readable medium of claim 15, wherein the set of modifications comprises one of addition and removal of a logical entity, wherein the separate updates added to the queues for each identified MFE reference a stored object for the logical entity.

18. The non-transitory machine readable medium of claim 15, wherein the set of modifications comprises a change to a property of a logical entity, wherein the separate updates added to the queues for each identified MFE reference a stored object for the property of the logical entity.

19. The non-transitory machine readable medium of claim 18, wherein the stored object for the property of the logical entity is related to a separate stored object for the logical entity.

20. The non-transitory machine readable medium of claim 15, wherein the set of modifications comprises an addition of a logical entity, wherein the network controller application further comprises a set of instructions for creating the set of objects for the logical entity.

21. The non-transitory machine readable medium of claim 15, wherein the plurality of MFEs execute on host machines, wherein the network controller application manages the plurality of MFEs by distributing the updates to local controllers that execute alongside the MFEs on the host machines.

22. The non-transitory machine readable medium of claim 21, wherein the set of modifications comprises removal of a logical entity, wherein the program further comprises sets of instructions for:
 distributing the update specifying the removal of the logical entity from each queue separately to the corresponding local controllers based on availability of the local controllers; and
 removing the set of objects stored for the logical entity only after the updates specifying the removal of the logical entity have been distributed to the local controllers for the identified MFEs.

23. The non-transitory machine readable medium of claim 15, wherein the network controller application is a first network controller in a cluster of network controllers that each manage different pluralities of MFEs.

24. The non-transitory machine readable medium of claim 23, wherein a second network controller also receives the same update specifying the set of modifications to the logical entity, identifies the MFEs of its plurality of MFEs to propagate the update, and adds separate updates to separate queues for each of its identified MFEs, wherein the MFEs identified by both the first and second network controllers implement the logical network to which the logical entity belongs.

25. The non-transitory machine readable medium of claim 15, wherein a first separate update added to a first queue comprises (i) a reference to the stored set of objects for the logical entity and (ii) metadata indicating the specified set of modifications to the logical entity.

26. The non-transitory machine readable medium of claim 25, wherein a second separate update added to a second queue comprises (i) a second reference to the stored set of objects for the logical entity and (ii) the same metadata indicating the specified set of modifications to the logical entity.

27. The non-transitory machine readable medium of claim 26, wherein the first and second references are pointers.

* * * * *